US010971952B2

(12) United States Patent
Kawamae et al.

(10) Patent No.: US 10,971,952 B2
(45) Date of Patent: Apr. 6, 2021

(54) WIRELESS POWER TRANSFER DEVICE

(71) Applicant: MAXELL, LTD., Kyoto (JP)

(72) Inventors: Osamu Kawamae, Kyoto (JP); Katsuei Ichikawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 267 days.

(21) Appl. No.: 16/070,301

(22) PCT Filed: Jan. 20, 2017

(86) PCT No.: PCT/JP2017/001933
§ 371 (c)(1),
(2) Date: Jul. 16, 2018

(87) PCT Pub. No.: WO2017/126656
PCT Pub. Date: Jul. 27, 2017

(65) Prior Publication Data
US 2019/0027970 A1 Jan. 24, 2019

(30) Foreign Application Priority Data

Jan. 21, 2016 (JP) .............................. JP2016-009871

(51) Int. Cl.
*H02J 5/00* (2016.01)
*H02J 50/12* (2016.01)
(Continued)

(52) U.S. Cl.
CPC .............. *H02J 50/12* (2016.02); *H02J 7/025* (2013.01); *H02J 50/05* (2016.02); *H02J 50/40* (2016.02);
(Continued)

(58) Field of Classification Search
CPC .. H02J 7/025; H02J 50/60; H02J 50/05; H02J 50/40; H02J 50/80; H02J 50/12; Y02B 40/90
See application file for complete search history.

(56) References Cited

U.S. PATENT DOCUMENTS

2008/0297107 A1 12/2008 Kato et al.
2010/0148723 A1 6/2010 Cook et al.
(Continued)

FOREIGN PATENT DOCUMENTS

EP      1986356 A2   10/2008
JP    2008-278025 A  11/2008
(Continued)

OTHER PUBLICATIONS

Japanese Office Action received in corresponding Japanese Application No. 2017-562921 dated Mar. 24, 2020.
(Continued)

Primary Examiner — Jared Fureman
Assistant Examiner — Esayas G Yeshaw
(74) Attorney, Agent, or Firm — Mattingly & Malur, PC

(57) ABSTRACT

The present invention improves charging efficiency in a wireless power transfer device. A wireless power transfer device wirelessly transfers power by using inductive coupling to a charging target device placed in the vicinity of a charging pad. The wireless power transfer device includes an amplifier for performing power amplification, a series resonant circuit constituted by a resonant capacitor and a power transfer coil, and a foreign material detection unit for detecting a non-charging device, which is not a charging target, placed in the vicinity of the charging pad. The foreign material detection unit is constituted by a pick-up coil, bandpass filters, detector circuits and a control circuit. The foreign material detection unit detects an IC card which is (Continued)

the non-charging device by a signal component emitted through inductive coupling with the power transfer coil from the device placed in the vicinity of the charging pad when transferring power.

11 Claims, 24 Drawing Sheets

(51) Int. Cl.
- *H02J 50/80* (2016.01)
- *H02J 50/40* (2016.01)
- *H02J 50/05* (2016.01)
- *H02J 50/60* (2016.01)
- *H02J 7/02* (2016.01)

(52) U.S. Cl.
CPC .............. *H02J 50/60* (2016.02); *H02J 50/80* (2016.02); *Y02B 40/00* (2013.01)

(56) References Cited

U.S. PATENT DOCUMENTS

| | | | |
|---|---|---|---|
| 2011/0234156 A1 | 9/2011 | Fujita | |
| 2013/0176023 A1 | 7/2013 | Komiyama | |
| 2013/0214735 A1* | 8/2013 | Kang | H02J 50/40 320/108 |
| 2013/0314036 A1* | 11/2013 | Nakagawa | H02J 50/40 320/108 |
| 2014/0240057 A1* | 8/2014 | Low | H02J 5/00 333/32 |
| 2014/0317424 A1 | 10/2014 | Akazawa | |
| 2015/0028875 A1 | 1/2015 | Irie et al. | |
| 2015/0069854 A1* | 3/2015 | Kim | H02J 5/005 307/104 |
| 2016/0064952 A1* | 3/2016 | Matsumoto | H02J 7/025 307/104 |
| 2016/0072339 A1 | 3/2016 | Shichino | |
| 2016/0141882 A1* | 5/2016 | Ichikawa | H02J 5/005 307/104 |
| 2016/0187519 A1 | 6/2016 | Widmer et al. | |
| 2016/0294220 A1* | 10/2016 | Kwon | H02J 50/40 |
| 2017/0063135 A1* | 3/2017 | Sultenfuss | H02J 7/025 |
| 2017/0338685 A1* | 11/2017 | Jung | B60L 8/00 |

FOREIGN PATENT DOCUMENTS

| | | |
|---|---|---|
| JP | 2008-295274 A | 12/2008 |
| JP | 2010-051137 A | 3/2010 |
| JP | 2011-205788 A | 10/2011 |
| JP | 2012-502612 A | 1/2012 |
| JP | 2012-205411 A | 10/2012 |
| JP | 2013-135518 A | 7/2013 |
| JP | 2013-162579 A | 8/2013 |
| JP | 2013-188072 A | 9/2013 |
| JP | 2013-251956 A | 12/2013 |
| JP | 2014-212592 A | 11/2014 |
| JP | 2015-012633 A | 1/2015 |
| JP | 2015-171160 A | 9/2015 |
| JP | 2018-504876 A | 2/2018 |
| WO | 2015/061178 A1 | 4/2015 |
| WO | 2015/177859 A1 | 11/2015 |

OTHER PUBLICATIONS

International Search Report of PCT/JP2017/001933 dated Mar. 28, 2017.

* cited by examiner

FIG. 3

| STATUS POWER RECEIVING DEVICE | FUNDAMENTAL WAVE | SECOND-ORDER HARMONIC WAVE | THIRD-ORDER HARMONIC WAVE | CURRENT OF POWER TRANSFER AMPLIFIER |
|---|---|---|---|---|
| TypeA | 10.5dBm | -23.7dBm | -24.3dBm | 244mA |
| FeliCa | 5.5dBm | -22.7dBm | -20.7dBm | 104mA |
| NONE | 9.2dBm | -2.5dBm | -19.0dBm | 56mA |
| | 7.7dBm | -21.3dBm | -30.3dBm | 47mA |

FIG. 16

| No. | DEVICE NAME | CHARGING TIME | On/off |
|---|---|---|---|
| 1 | POWER RECEIVING DEVICE a | 60 | on |
| 2 | POWER RECEIVING DEVICE b | 30 | on |
| 3 | — | | |
| 4 | — | | |

FIG. 17

| No. | DEVICE NAME | CHARGING TIME | On/off |
|---|---|---|---|
| 1 | POWER RECEIVING DEVICE a | 80 | on |
| 2 | POWER RECEIVING DEVICE b | 40 | on |
| 3 | POWER RECEIVING DEVICE c | 15 | on |
| 4 | POWER RECEIVING DEVICE d | — | off |

FIG. 19

| No. | DEVICE NAME | CHARGING TIME | On/off |
|---|---|---|---|
| 1 | POWER RECEIVING DEVICE a | 65 | on |
| 2 | POWER RECEIVING DEVICE b | 25 | on |
| 3 | POWER RECEIVING DEVICE c | 0 | on→off |
| 4 | POWER RECEIVING DEVICE d | — | off |

FIG. 20

| No. | DEVICE NAME | CHARGING TIME | On/off |
|---|---|---|---|
| 1 | POWER RECEIVING DEVICE a | 65 | on |
| 2 | POWER RECEIVING DEVICE b | 25 | on |
| 3 | POWER RECEIVING DEVICE c | — | off |
| 4 | POWER RECEIVING DEVICE d | 10 | off→on |

*FIG. 22*

| No. | DEVICE NAME | CHARGING TIME | On/off |
|---|---|---|---|
| 1 | POWER RECEIVING DEVICE a | 60 | on |
| (2) | POWER RECEIVING DEVICE b | 30 | on |
| 3 | POWER RECEIVING DEVICE c | 15 | on |
| 4 | — | | |

*FIG. 23*

| No. | DEVICE NAME | CHARGING TIME | On/off |
|---|---|---|---|
| 1 | POWER RECEIVING DEVICE a | — | off |
| (2) | POWER RECEIVING DEVICE b | 10 | on |
| 3 | POWER RECEIVING DEVICE c | — | off |
| 4 | — | | |

FIG. 25

| No. | DEVICE NAME | CHARGING TIME | On/off |
|---|---|---|---|
| 1 | POWER RECEIVING DEVICE a | — | off |
| (2) | POWER RECEIVING DEVICE b | 0 | on→off |
| 3 | POWER RECEIVING DEVICE c | — | off |
| 4 | — | | |

FIG. 26

| No. | DEVICE NAME | CHARGING TIME | On/off |
|---|---|---|---|
| 1 | POWER RECEIVING DEVICE a | 40 | on |
| 2 | POWER RECEIVING DEVICE b | — | off |
| 3 | POWER RECEIVING DEVICE c | 10 | on |
| 4 | — | | |

FIG. 28

| No. | DEVICE NAME | CHARGING TIME | On/off |
|---|---|---|---|
| 1 | POWER RECEIVING DEVICE a | 60 | on |
| 2 | POWER RECEIVING DEVICE b | 30 | on |
| 3 | — | | |
| 4 | — | | |

FIG. 29

| No. | DEVICE NAME | CHARGING TIME | On/off |
|---|---|---|---|
| (1) | POWER RECEIVING DEVICE a | 40 | on |
| 2 | POWER RECEIVING DEVICE b | 40 | on |
| 3 | — | | |
| 4 | — | | |

WIRELESS POWER TRANSFER DEVICE

TECHNICAL FIELD

The present invention relates to a wireless power transfer device, and particularly relates to a technique effective for performing wireless charging to a battery in, for example, a small portable device such as a mobile device.

BACKGROUND ART

As a wireless power transfer system utilizing resonance in coils, studies have been conducted on wireless power transfer methods, particularly on those having a feature in which a Q factor of the coil is increased such that a transmission distance between a power transfer coil and a power receiving coil is increased while being unaffected by misalignment between the power transfer coil and the power receiving coil.

However, when a charging distance is increased while being unaffected by misalignment, measures to prevent adverse effects caused by surrounding metals and to prevent interferences to other wireless devices become necessary. For this reason, there is a growing demand for improving sensitivity and accuracy of detecting a foreign material in the wireless power transfer device.

A known technique of foreign material detection performed by this type of wireless power transfer device is disclosed in, for example, Patent Document 1. Patent Document 1 discloses a technique of detecting a foreign material by utilizing a power supplying means for transmitting a predetermined power to the outside, a first value indicating a reflection of the predetermined power detected when a resonance means for resonating with an external device is in a first state, and a second value indicating a reflection of the predetermined power detected after the first value is detected and when a state of the resonance means is changed from a second state to the first state.

RELATED ART DOCUMENTS

Patent Documents

Patent Document 1: Japanese Unexamined Patent Application
Publication No. 2013-162579

SUMMARY OF THE INVENTION

Problems to be Solved by the Invention

In the above-described Patent Document 1, a VSWR meter of a CM coupler is utilized for detecting a reflected wave of power transferred. However, the VSWR meter of the CM coupler requires a relatively large component such as a toroidal core for clamping a high frequency current supplied from a power transfer amplifier to the power transfer coil. For this reason, there is a problem in that it is not suitable for miniaturization of the device.

In addition, since the high frequency current is clamped by the toroidal core as described above, there is a problem in that resistance loss by the toroidal core would occur and cause efficiency to decrease. Further, since detection sensitivity of the VSWR meter of the CM coupler utilized for detecting the reflected wave is low, there is a problem in that it would be insufficient in terms of accuracy of detecting a foreign material.

An object of the present invention is to provide a technique in which charging efficiency in a wireless power transfer device can be improved.

The above-described object, other objects and novel features of the present invention will be apparent from the descriptions in the present specification and the attached drawings.

Means for Solving the Problems

The following briefly describes an overview of a representative invention disclosed in the present application.

Namely, a representative wireless power transfer device wirelessly transfers power by using inductive coupling to a charging target device placed in the vicinity of a charging pad. The wireless power transfer device includes an amplifier for performing power amplification, a series resonant circuit constituted by a resonant capacitor and a power transfer coil, and a foreign material detection unit for detecting a non-charging device, which is not a charging target, placed in the vicinity of the charging pad. The foreign material detection unit detects the non-charging device by a signal component emitted from the device placed in the vicinity of the charging pad.

In particular, the foreign material detection unit includes a signal detection unit, a first filter unit, a detector circuit and a control unit. The signal detection unit detects the signal component emitted from the device placed on the charging pad. The first filter unit allows a signal having a predetermined frequency among the signal components detected by the signal detection unit to pass therethrough.

The detector circuit detects the signal passed through the first filter unit as a signal level. The control unit determines whether or not the non-charging device which is not the charging target is placed on the charging pad based on the signal level detected by the detector circuit.

In addition, the control unit compares the signal level detected by the detector circuit and a predetermined threshold and, if it is determined that the signal level is outside the range of the predetermined threshold, determines that the non-charging device is placed in the vicinity of the charging pad.

Here, basic terms used in the present application will be defined. A device for wirelessly transferring power by using inductive coupling is referred to as a wireless power transfer device, and a device to be charged by this wireless power transfer device is referred to as a charging target device. In addition, a wireless charging device having a system that differs from the wireless power transfer device and a wireless device or an electronic device, such as an IC card or a terminal device, that does not originally have a wireless charging function are each defined as a non-charging device. In addition, a device in which the wireless power transfer device and the charging target device are combined is referred to as a wireless power transfer device.

Note that a wireless transmission distance between the wireless power transfer device and the charging target device is within a range in which inductive coupling is possible, and in a case where, for example, the power transfer frequency is 6.78 MHz, the distance is only a few centimeters.

In addition, a representative wireless power transfer device wirelessly transfers power to a plurality of charging target devices. This wireless power transfer device includes a power source unit, a control unit, and a communication unit. The power source unit generates power to be transferred to the charging target devices. The control unit controls an operation of the power source unit. The communication unit performs communication with the charging target devices.

In particular, the control unit performs communication with the charging target devices to be charged via the communication unit, detects the number of charging target devices to be charged, determines whether or not the number of detected charging target devices is less than or equal to a predetermined number of chargeable devices and, if it is determined that the number of detected charging target devices is greater than the predetermined number of chargeable devices, performs controls such that the same number of charging target devices as the predetermined number of chargeable devices are prioritized and charged.

Effects of the Invention

The following briefly describes an effect obtained by the representative invention disclosed in the present application.

According to the wireless power transfer device, charging efficiency can be improved.

BRIEF DESCRIPTION OF THE DRAWINGS

FIG. 3 is an explanatory drawing showing an example of current values of a current flowing through a field effect transistor and fundamental/harmonic waves detected by a pick-up coil within the wireless power transfer device of FIG. 1;

FIG. 16 is an explanatory drawing showing a display example of charging information displayed on a display unit within the wireless power transfer device of FIG. 11;

FIG. 17 is an explanatory drawing showing a display example of the charging information continued from FIG. 16;

FIG. 19 is an explanatory drawing showing a display example of charging information displayed on a display unit within the wireless power transfer device of FIG. 11 when supplying of power to the power receiving device is completed;

FIG. 20 is an explanatory drawing showing a display example of the charging information continued from FIG. 19;

FIG. 22 is an explanatory drawing showing a display example of charging information displayed on a display unit within the wireless power transfer device of FIG. 11 when the power receiving device to be prioritized and supplied with power is selected;

FIG. 23 is an explanatory drawing showing a display example continued from FIG. 22;

FIG. 25 is an explanatory drawing showing a display example of the charging information displayed on the display unit within the wireless power transfer device of FIG. 11 when charging of the power receiving device is completed;

FIG. 26 is an explanatory drawing showing a display example of the charging information continued from FIG. 25;

FIG. 28 is an explanatory drawing showing a display example of charging information displayed on a display unit within the wireless power transfer device of FIG. 11 when the power receiving device is supplied with power; and FIG. 29 is an explanatory drawing showing a display example of the charging information continued from FIG. 28.

DETAILED DESCRIPTION OF PREFERRED EMBODIMENTS

In the embodiments described below, the invention will be described in a plurality of sections or embodiments if necessary for the sake of convenience. However, these sections or embodiments are not irrelevant to each other unless otherwise clearly specified, and one section or embodiment partially or entirely corresponds to another section or embodiment as a modification, detailed or supplementary description or the like.

In addition, in the embodiments described below, when referring to the number of components (including number of pieces, numerical value, amount and range), the number is not limited to a specified number and may be less than or greater than this number unless otherwise clearly specified or unless it is obvious that the number is limited to the specified number in principle.

Further, in the embodiments described below, it goes without saying that each component (including an element step) is not indispensable unless otherwise clearly specified or unless it is obvious from the context that the component is indispensable in principle.

Likewise, in the embodiments described below, when referring to a shape, a positional relation or the like of a component, a substantially approximate shape, a similar shape or the like is included unless otherwise clearly specified or unless it is obvious from the context that the shape, the positional relation or the like of the component differs in principle. The same applies to the above-described numerical value and range.

In addition, in all of the drawings that describe the embodiments, the same members are generally denoted by the same reference signs, and redundant descriptions thereof will be omitted as appropriate.

Hereinafter, the embodiments will be described in detail.

First Embodiment

<Overview>

According to a first embodiment, a wireless power transfer device detects a difference between a receiving power and a transferring power via wireless communication, measures levels of fundamental waves and harmonic waves sent from a rectifier circuit of a power receiving device, and measures a current value of a current flowing through a power transfer amplifier when a power source voltage of the power transfer amplifier is changed.

<Configuration Example of Wireless Power Transfer Device>

Figure 1:
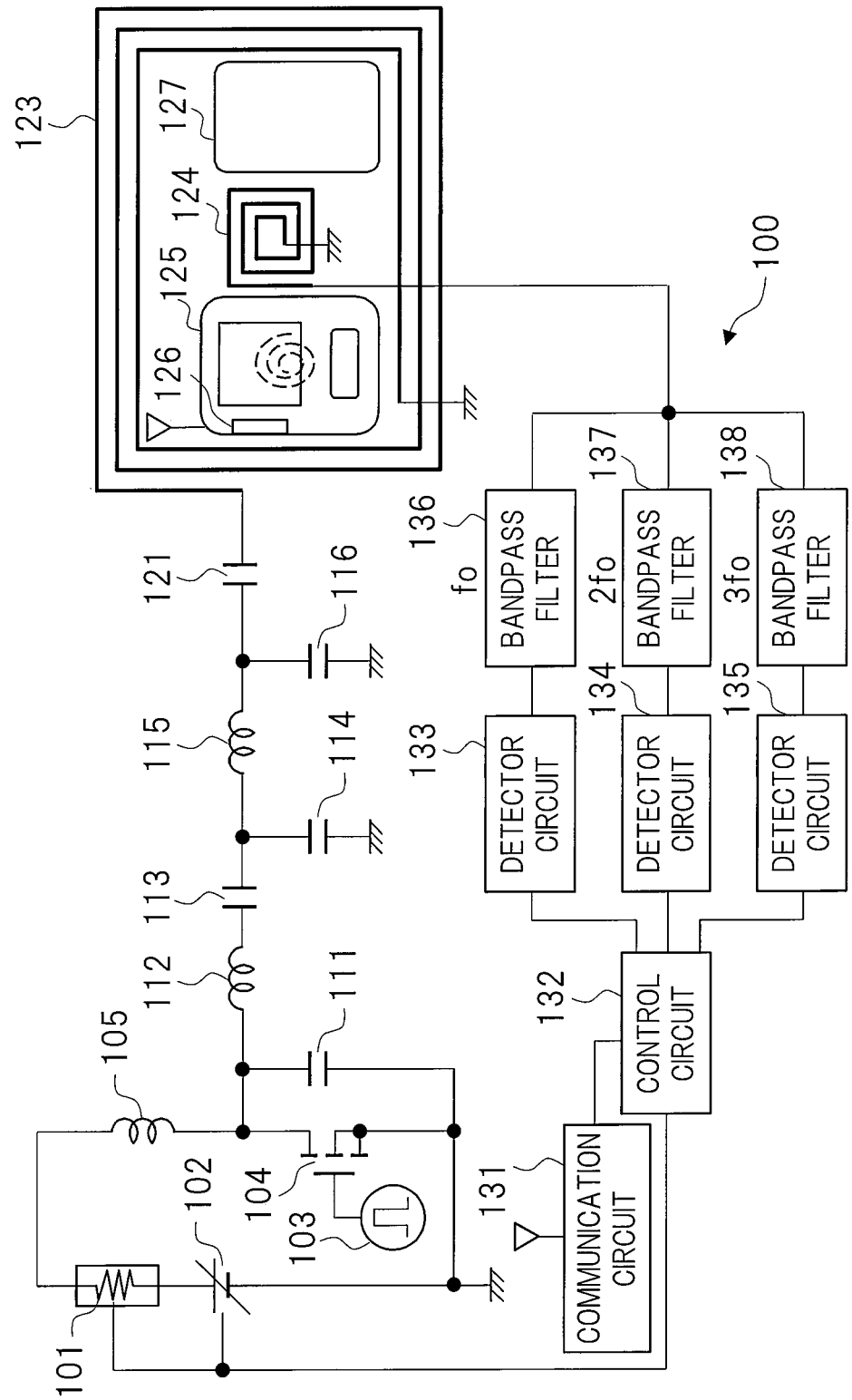
FIG. 1 is an explanatory drawing showing a configuration example of a wireless power transfer device according to a first embodiment.

FIG. 1 is an explanatory drawing showing a configuration example of a wireless power transfer device 100 according to the first embodiment.

As shown in FIG. 1, the wireless power transfer device 100 includes a current detector 101, a variable voltage power source 102, a field effect transistor 104, a choke coil 105, electrostatic capacitors 111, 113, 114 and 116, inductors 112 and 115, a resonant capacitor 121, a power transfer coil 123, a pick-up coil 124, a communication circuit 131, a control circuit 132, detector circuits 133, 134 and 135 and bandpass filters 136, 137 and 138.

The current detector 101 and the variable voltage power source 102 are connected to a drain of the field effect transistor 104 via the choke coil 105. The electrostatic capacitor 111 is connected in parallel between the drain and source of the field effect transistor 104, and the inductor 112 and the electrostatic capacitor 113 are connected to the drain of the field effect transistor 104.

In addition, a Class E switching amplifier is constituted by the field effect transistor 104, the choke coil 105, the electrostatic capacitor 111, the inductor 112 and the electrostatic capacitor 113.

Further, a low-pass filter constituted by the electrostatic capacitor 114, the inductor 115 and the electrostatic capacitor 116 is connected to an output of the Class E switching amplifier. The low-pass filter is a third filter unit.

The resonant capacitor 121 is connected to the low-pass filter constituted by the electrostatic capacitor 114, the inductor 115 and the electrostatic capacitor 116, and the power transfer coil 123 is connected to the resonant capacitor 121. In addition, a series resonant circuit is constituted by the resonant capacitor 121 and the power transfer coil 123. Note that the resonant capacitor 121 has a value selected such that the power transfer coil 123 resonates by a power transfer frequency.

Each of the power transfer coil 123 and pick-up coil 124 is provided so as to be embedded in a surface of a charging pad (not shown) or in the charging pad itself. The charging pad is a non-contact, square-shaped pad, and charging is performed by placing, for example, a mobile device 125 on the charging pad.

The power transfer coil 123 is provided in the vicinity of an outer periphery of the charging pad, and the pick-up coil 124 is provided more inward than the power transfer coil 123 at a position, for example, in the vicinity of a center portion of the charging pad, that is, in the vicinity of a center portion of the power transfer coil 123.

Each of the bandpass filters 136, 137 and 138 which is a first filter unit is connected in parallel to an output unit of the pick-up coil 124 which is a signal detection unit. In a case where a power transfer frequency band is, for example, 6.87 MHz, the bandpass filters 136, 137 and 138 respectively allow the fundamental wave having a frequency of 6.78 MHz, the second-order harmonic wave having a frequency of 13.56 MHz and the third-order harmonic wave having a frequency of 20.34 MHz to pass therethrough.

Each of the signals having passed through the bandpass filters 136, 137 and 138 is transmitted to the detector circuits 133, 134 and 135, is detected by the detector circuits 133, 134 and 135 and is converted into a detection voltage. Each detection voltage detected by the detector circuits 133, 134 and 135 is transmitted to the control circuit 132. A foreign material detection unit is constituted by the pick-up coil 124, the bandpass filters 136 to 138, the detector circuits 133 to 135 and the control circuit 132.

Here, the mobile device 125 shown in FIG. 1 is the charging target device of the wireless power transfer device 100 and is comprised of a portable electronic device such as a tablet computer and a mobile phone including a smartphone. An IC card 127 also shown in FIG. 1 is not a charging target device but is a device, that is, the non-charging device, accidentally placed in the vicinity of the charging pad and is illustrated as a foreign material.

The mobile device 125 which is the charging target device comprises a communication circuit 126. The communication circuit 126 performs communication with the communication circuit 131 within the wireless power transfer device 100. The communication circuit 131 is a communication unit. Communication between the communication circuit 126 and the communication circuit 131 is utilized, for example, for authentication as to whether or not the device is the charging target device and for charging controls.

The current detector 101 which is a current detection unit measures the current flowing through the field effect transistor 104 during supplying of power. The variable voltage power source 102 which is a variable power source unit outputs a power source voltage of a freely selected voltage level based on a control signal. The control circuit 132 receives the measurement result of the current detector 101 and a status of the receiving power such as the amount of power the mobile device 125 is currently receiving via the communication circuit 126, generates the above-described control signal based on this result and outputs the signal to the variable voltage power source 102.

<Operation Example of Class E Switching Amplifier>

Next, operations of the above-described Class E switching amplifier constituted by the field effect transistor 104, the choke coil 105, the current detector 101, the variable voltage power source 102, the electrostatic capacitor 111, the inductor 112 and the electrostatic capacitor 113 will be described.

In a case where the power transfer frequency is 6.78 MHz, the choke coil 105 has a value selected so as to have a significantly higher impedance in 6.78 MHz. For this reason, a high frequency current having a substantially constant value flows through the choke coil 105.

Here, a drive signal 103 for turning a gate of the field effect transistor 104 on or off according to the power transfer frequency is applied. The drive signal 103 is transmitted from the control circuit 132.

When the field effect transistor is turned on, the electrostatic capacitor 111 is in a short-circuit state, meaning that the inductor 112 and the electrostatic capacitor 113 form a resonant circuit. When the field effect transistor 104 is turned off, the electrostatic capacitor 111, the inductor 112 and the electrostatic capacitor 113 form the resonant circuit.

At this time, a resonant frequency value of the resonant circuit formed by the inductor 112 and the electrostatic capacitor 113 slightly differs from a resonant frequency value of the resonant circuit formed by the electrostatic capacitor 111, the inductor 112 and the electrostatic capacitor 113 depending on whether or not the electrostatic capacitor 111 is present.

However, by selecting the values of the electrostatic capacitor 111, the inductor 112 and the electrostatic capacitor 113 such that the power transfer frequency is between these resonant frequencies, the transferring power is transmitted from the Class E switching amplifier with high efficiency.

In addition, when the power source voltage applied to the drain of the field effect transistor 104 is increased, a power transfer amplitude is increased and causes the transferring power to increase, and thus, the power transmitted from the Class E switching amplifier can be adjusted by the power source voltage.

<Regarding Filter Circuit of Class E Switching Amplifier>

Here, the low-pass filter constituted by the electrostatic capacitor 114, the inductor 115 and the electrostatic capacitor 116 will be described.

A filter circuit constituted by the electrostatic capacitor 114, the inductor 115 and the electrostatic capacitor 116 is a third-order low-pass filter. This is because the power transfer coil 123 connected to an output stage and the resonant capacitor 121 configure the series resonant circuit, and in a case where no mobile device 125 is present, the power transfer coil 123 and the resonant capacitor 121 would be in a short-circuit state by a series resonance.

For this reason, the filter circuit is a parallel circuit constituted by the electrostatic capacitor 114 and the inductor 115, and since it is designed such that the resonant frequencies have values close to the power transfer frequency, load impedance of the field effect transistor 104 which is the power transfer amplifier is increased. As a result, if no mobile device 125 which is the charging target device is present, unnecessary overcurrent does not flow to the field effect transistor 104.

In a case where the power transfer coil side has a low impedance in such a third-order low-pass filter, a load impedance of the field effect transistor 104 is increased. On the other hand, in a case where the power transfer coil side has a high impedance, the load impedance is reduced by the series circuit constituted by the inductor 115 and the electrostatic capacitor 116.

From this, it can be seen that the third-order low-pass filter has a function for inverting a value of the load impedance. The above-described example is of the third-order low-pass filter; however, in the fifth-order low-pass filter in which the third-order low-pass filter is connected in two stages, the value of the inverted impedance is reverted to the original value.

In this case, if no mobile device 125 is present, the load impedance on an output end of the field effect transistor 104 is reduced, causing an overcurrent to flow through the field effect transistor 104 and operation to become unstable.

Therefore, the third-order, seventh-order or eleventh-order low-pass filter is utilized in the filter circuit so as to provide a configuration in which no overcurrent flows through the field effect transistor 104 when no mobile device 125 which is the charging target device is present.

<Charging Sequence>

Next, a charging sequence performed by the wireless power transfer device 100 will be described.

Figure 2:
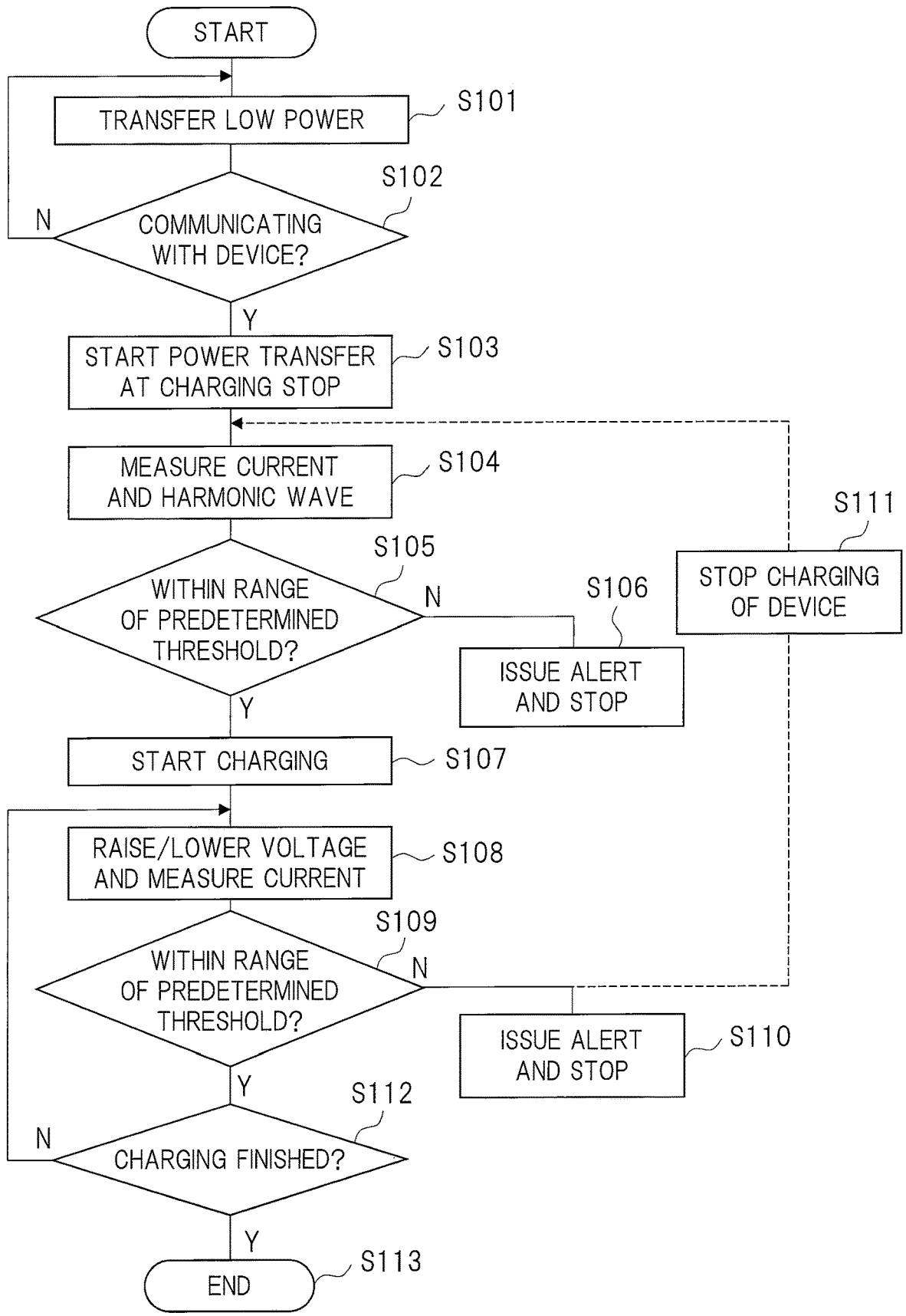
FIG. 2 is a flowchart showing an example of a charging sequence performed by the wireless power transfer device of FIG. 1.

FIG. 2 is a flowchart showing an example of the charging sequence performed by the wireless power transfer device 100 of FIG. 1. FIG. 2 shows the sequence corresponding to foreign material detection performed during charging of the mobile device 125.

First, the control circuit 132 outputs the drive signal 103 to the field effect transistor 104 to start operation of the Class E amplifier and start power transfer with a power low enough to turn on the communication circuit 126 of the mobile device 125 which is the charging target device to the power transfer coil 123 (step S101).

The control circuit 132 performs determination as to whether or not communication with the mobile device 125 has started (step S102). When the mobile device 125 which is the charging target device is placed in the vicinity of the charging pad in a process of step S102, the communication circuit 126 of the mobile device 125 is turned on by the received power, and communication is started. In addition, if communication with the mobile device 125 does not start, that is, if the mobile device 125 is not placed in the vicinity of the charging pad, the process returns to step S101.

Subsequently, when communication with the mobile device 125 is started, power transfer is started without starting the charging of the mobile device 125 (step S103). Then, measurements of the current and each harmonic wave flowing through the field effect transistor 104 at this time are performed (step S104). As described above, the current value is measured by the current detector 101, and each harmonic wave is measured by the detector circuits 133 to 135.

The control circuit 132 determines whether or not the values of the measured current and each harmonic wave are within a range of a corresponding predetermined threshold (step S105). In the process of step S105, if the values of the measured current and each harmonic wave are within the range of the corresponding predetermined threshold, the control circuit 132 starts the charging of the mobile device 125 (step S107).

In addition, in the process of step S105, if the values of the measured current and each harmonic wave exceed the range of the corresponding predetermined threshold, the control circuit 132 outputs an alert, stops the power transfer and stops the charging operation of the mobile device 125 (step S106).

Here, an example of the above-described determination performed by the predetermined threshold will be described. If the second-order harmonic level is higher than the predetermined threshold, or if the fundamental wave level is higher than the predetermined threshold, or if the current of the amplifier is higher than the range of the predetermined threshold, it is highly possible that a foreign material such as the IC card 127 is placed in the vicinity of the charging pad, and thus, measures such as stopping the power transfer are taken.

In the process of step S106, the control circuit 132 sends, for example, message information indicating that a foreign material has been detected as an alert via the communication circuit 131. The communication circuit 126 of the mobile device 125 receives the message information sent via the communication circuit 131 and displays a message on a monitor or the like within the mobile device 125. At this time, an alarm sound or the like may be emitted.

In the process of step S107, when charging of the mobile device 125 is started, the control circuit 132 outputs a control signal to the variable voltage power source 102 such that the voltage level of the power source voltage of the field effect transistor 104 is raised and lowered at a certain interval, and the current value of the current flowing through the field effect transistor 104 is measured (step S108).

Then, the control circuit 132 determines whether or not the measured current value is within the range of the corresponding predetermined threshold (step S109). If the current value exceeds the range of the predetermined threshold, the control circuit 132 outputs an alert and stops the power transfer (step S110). Alternatively, the charging operation of the mobile device 125 may be stopped (step S111), and the process may return to step S104, so that the current value and the value of each harmonic wave are measured again.

Here, an example of the above-described determination performed by the predetermined threshold will be described. If the amount of the current of the amplifier changed according to the increase in the power source voltage is less than the predetermined threshold, it is highly possible that a foreign material such as the IC card 127 has been placed in the vicinity of the charging pad during charging, and thus, measures such as stopping the power transfer are taken.

In addition, in the process of step S109, if the measured current value is less than or equal to the predetermined threshold, charging of the mobile device 125 is continued until the charging is completed (step S112).

With the above-described operation, the charging operation that started from detecting the charging target device including a foreign material ends when charging of the charging target device detection is completed.

Here, in the process of step S108, the current value of the current flowing through the field effect transistor 104 is measured by raising and lowering the voltage level of the power source voltage of the field effect transistor 104 at a certain interval; however, the foreign material may be detected by additionally comparing the receiving power of the mobile device 125 and the transferring power to be sent from the wireless power transfer device 100 and determining that the difference between the powers is greater than or equal to a predetermined threshold. This comparison between the receiving power and the transferring power may be performed instead of the process of step S108 or may be simultaneously performed with the process of step S108, and the measurement of the harmonic level may be further performed in step S108.

In addition, the receiving power is measured by a receiving power measuring unit (not shown) within the mobile device 125, and the measured receiving power is sent to the communication circuit 131 via the communication circuit 126 of the mobile device 125.

Then, the control circuit 132 having received the power calculates a difference between the receiving power and the transferring power and determines whether or not the difference is greater than or equal to a predetermined threshold. A technique of foreign material detection using this difference between the receiving power and the transferring power is effective in detecting, for example, a foreign metal, and will be described in detail below.

<Operation Example of Foreign Material Detection in Wireless Power Transfer Device>

Next, operations of foreign material detection in the wireless power transfer device 100 of FIG. 1 will be described.

Here, operations up to the start of the power transfer performed by the wireless power transfer device 100 and operations of detecting foreign material such as the IC card 127 of FIG. 1 will be described.

First, the wireless power transfer device 100 performs communication with the communication circuit 126 of the mobile device 125 via the communication circuit 131, performs authentication as to whether or not the device is the mobile device 125 which is the charging target device, and thereafter, charging is started.

At this time, harmonic components of the power receiving frequency are emitted from the rectifier circuit (not shown) within the mobile device 125 in a reverse direction with respect to a power receiving coil (not shown) in the same mobile device 125. The power receiving coil receives a signal transferred from the power transfer coil 123. The rectifier circuit rectifies the signal received by the power receiving coil and converts it into a direct current voltage.

The pick-up coil 124 detects the emitted harmonic components and transmits the detected harmonic components to the bandpass filters 136 to 138. The bandpass filter 136 separates the fundamental wave from the harmonic components detected by the pick-up coil 124. The bandpass filter 137 separates second-order harmonic components from the detected harmonic components. The bandpass filter 138 separates third-order harmonic components from the detected harmonic components.

Then, signals separated into the fundamental wave, the second-order harmonic components and the third-order harmonic components by the bandpass filters 136 to 138 are each detected by the detector circuits 133 to 135.

At this time, in a case where the IC card 127 or the like which is a foreign material is accidentally placed in the vicinity of the power transfer coil 123, that is, in the vicinity of the charging pad, harmonic components are generated by the IC card 127, and these harmonic components are detected by the pick-up coil 124.

In the case where the IC card 127 or the like is accidentally placed in the vicinity of the charging pad and its harmonic components are detected, the control circuit 132 outputs a command to the mobile device 125 via the communication circuit 131 and the communication circuit 126 of the mobile device 125 to temporarily turn off the charging operation of the battery installed in the mobile device 125.

This reduces the current flowing through the rectifier circuit of the mobile device 125 and causes an occurrence level of the harmonic wave to decrease, so that it is easier to detect a harmonic wave of a foreign material such as the IC card 127 that generates in the case where the IC card 127 is accidentally placed. This makes it possible to improve accuracy of detecting a foreign material such as the IC card 127.

Note that the operations in which charging of the battery in the mobile device 125 is turned off may be performed after the mobile device 125 is placed on the charging pad, authentication of the mobile device 125 is completed and charging is started, or alternatively, charging of the mobile device 125 may be periodically turned off during charging.

In addition, a foreign material is also detected by a current value of the current flowing through the field effect transistor 104.

For example, in the case where a foreign material such as the IC card 127 is placed, an electromotive force is generated in a power receiving antenna of the IC card 127 by the transferring power, causing a current to flow through the circuit on the IC card side. This causes the current flowing through the field effect transistor 104 to change, and thus, foreign material detection can be performed by measuring this changed amount.

Specifically, during charging of the mobile device 125, the control circuit 132 outputs a control signal to periodically raise and lower the power source voltage of the variable voltage power source 102. The current flowing through the field effect transistor 104 at this time is measured by the current detector 101.

At this time, if the amount of the current changed when the voltage is changed is less than or equal to a certain value, it is highly possible that the transferring power is being partially consumed by a foreign material such as the IC card 127. This is because the changed amount of the current corresponding to the change in voltage differs between a case where only the charging target device is present and a case where a foreign material such as the IC card 127 is additionally present; this relation between the change in voltage and the changed amount of the current will be described in detail below. At this time, the control circuit 132 determines that a foreign material has been detected and outputs a command which temporarily turns off the charging operation of the battery installed in the mobile device 125 to the mobile device 125 via the communication circuit 131 and the communication circuit 126 of the mobile device 125.

Thus, accuracy of detecting a foreign material such as the IC card 127 can be further improved by utilizing the technique of detecting the change in the current flowing through the field effect transistor 104 when the power source voltage of the field effect transistor 104 which is the power transfer amplifier is changed during charging, in addition to the technique of detecting the harmonic level when the charging of the battery in the mobile device 125 is turned off.

The present embodiment has described a case where the technique of detecting the harmonic level and the technique of detecting the change in the current are utilized; however, the wireless power transfer device 100 capable of performing highly accurate foreign material detection can be achieved even if only one of the above-described techniques is utilized.

<Regarding Technique of Foreign Material Detection>

Next, a technique of the foreign material detection performed by the wireless power transfer device 100 of FIG. 1 will be described.

When considering a case where power is wirelessly supplied in the power transfer frequency band of 6.78 MHz, there is almost no metal heat generation caused by a skin effect, unlike a case where power is wirelessly supplied in a band of 100 kHz. On the contrary, efficiency degradation caused by a resonant frequency shift that occurs when the magnetic field of the coil is blocked from changing is likely to occur, as well as other interferences to corresponding mobile devices, such as generation of heat in the coupled IC card due to the IC card having a relatively close resonant frequency band of 13.6 MHz, leading to breakage of the IC card.

Regarding the resonant frequency shift caused by the foreign metal, data of the value of the power to be received by the device on a power receiving end is transmitted to the wireless power transfer device 100 via wireless communication, and values of the transferring power and the receiving power are compared. If the difference between the transferring power and the receiving power is greater than or equal to a certain value, it can be assumed that the resonant frequency shift caused by the foreign metal is occurring, and thus, detection of foreign metal can be performed.

However, in the devices having a relatively close resonant frequency such as the IC card, sensitivity of detecting foreign metal needs to be high enough to prevent breakage of the device. On the other hand, in the IC card or the like, the power received by the power receiving antenna within the IC card is rectified by a rectifier circuit such as a diode and is used as an operating power source, and when the power is rectified, harmonic components are generated by non-linear characteristics of the diode.

In this case, it is highly possible that second-order harmonic components or third-order harmonic components are generated. At this time, characteristics of the device on the power receiving end changes according to changes in a current capacity of the diode utilized in the rectifier circuit, so that differences occur in the generated harmonic levels.

In addition, in the case where the operation frequency of the IC card is 13.56 MHz, the second-order harmonic wave has a frequency of 27.12 MHz and the third-order harmonic wave has a frequency of 40.68 MHz. On the other hand, in the case where the power transfer frequency is 6.78 MHz, the second-order harmonic wave has a frequency of 13.56 MHz and the third-order harmonic wave has a frequency of 20.34 MHz.

Here, 6.78 MHz tripled is equal to 20.34 MHz; however, this frequency does not occur in an IC card utilizing the operation frequency of 13.56 MHz.

From the above, the pick-up coil 124 for picking up the harmonic wave from the device on the power receiving end is provided, and each harmonic component is separated by the bandpass filters 136 to 138 and is then detected by the detector circuits 133 to 135, so that each harmonic level can be detected.

<Example of Technique of Harmonic Wave Detection>

Next, a studied technique of harmonic wave detection in the wireless power transfer device 100 of FIG. 1 will be concretely described.

FIG. 3 is an explanatory drawing showing an example of current values of the current flowing through the field effect transistor 104 and fundamental/harmonic waves detected by the pick-up coil 124 within the wireless power transfer device 100 of FIG. 1.

FIG. 3 shows an example of measurement results in a case where the pick-up coil 124 is installed at approximately the center of the power transfer coil 123 of FIG. 1 and the mobile device 125 which is the power receiving device is placed at a position about 5 mm above the pick-up coil 124.

In addition, measurements have been performed in the same manner for IC cards such as a Type-A card complying to ISO (International Organization for Standardization)/IEC (International Electrotechnical Commission) 18092 standard and FeliCa (registered trademark) as foreign materials. The Type-A card is an IC card utilized in, for example, a Taspo card and a Basic Resident Registration Card.

Note that the power transfer coil 123 utilized for the measurements has a height of about 12.5 cm and a width of about 14.8 cm and is wound with five turns. In addition, the pick-up coil 124 has a diameter of about 20 mm and is wound with three turns.

As shown in FIG. 3, FeliCa has a particularly high second-order harmonic level although the current flowing through the power transfer amplifier, that is, the field effect transistor 104, is small, and thus, it is considered that detection of FeliCa is possible by detecting the second-order harmonic wave generated in FeliCa and the current value of the current flowing through the power transfer amplifier.

On the other hand, the Type-A card has relatively low second-order and third-order harmonic levels, and thus, it is considered difficult to identify between the card and the power receiving device, that is, the mobile device 125. On the other hand, it can be seen that the fundamental wave levels and the current of the power transfer amplifier differ between the power receiving device and the Type-A card. Thus, it is considered that detection is possible from the fundamental wave level and the current value of the power transfer amplifier.

However, this can only be applied in a case where a single device is present. In a case where, for example, the charging target device and the IC card which is the non-charging device are simultaneously placed, it is considered that detection of the IC card would be difficult while the charging target device is being wirelessly charged since the charging target device is likely to have various charging specifications.

For this this reason, when detecting harmonic waves, a command which performs controls such that the power receiving operation is temporarily stopped is sent from the wireless power transfer device 100 to the charging target device side, that is, to the mobile device 125, so that the charging operation is stopped, and thereafter, the harmonic waves and the current of the power transfer amplifier are measured, as described above.

It can be seen from the results of FIG. 3 that, even if the third-order harmonic wave is not detected, determination is still possible by detecting the second-order harmonic wave.

In addition, a technique of detecting a current value of the current flowing through the field effect transistor 104 when the power source voltage of the field effect transistor 104 is controlled and the transferring power is changed which is another technique of improving accuracy will be studied.

Figure 4:
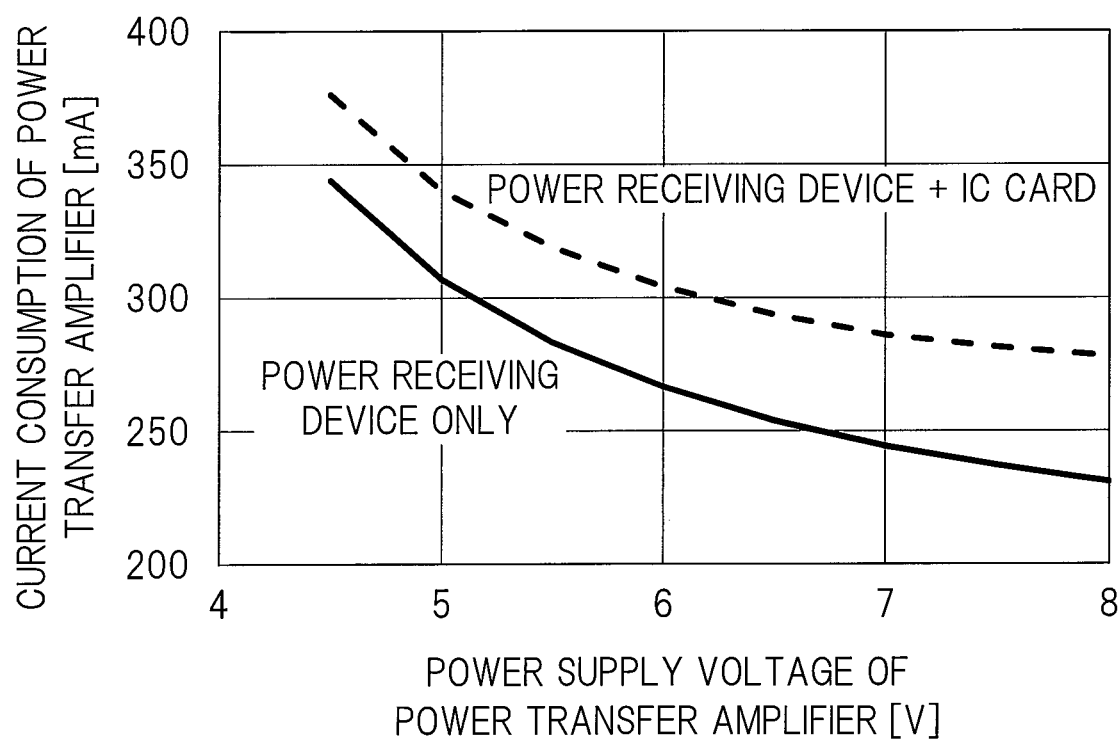
FIG. 4 is an explanatory drawing showing an example of measurement results of a current flowed with respect to a power source voltage of a field effect transistor when a power transfer coil of FIG. 1 is utilized.

FIG. 4 is an explanatory drawing showing an example of measurement results of the current flowed with respect to the power source voltage of the field effect transistor 104 when the power transfer coil 123 of FIG. 1 is utilized. Measurement conditions of the power transfer coil 123 and the pick-up coil 124 in FIG. 4 are the same as those of FIG. 3.

In addition, FIG. 4 shows measurements of the current value performed under a condition in which the mobile device 125 which is the power receiving device is placed at a position about 5 mm above the power transfer coil 123 as in the case of FIG. 3 and a Type-A IC card as a foreign material is placed next to the power receiving device and under a condition in which no Type-A IC card is placed next to the power receiving device.

As shown in FIG. 4, in a case where only the power receiving device is present, the current flowing through the field effect transistor 104 which is the power transfer amplifier is reduced as the power source voltage and the transferring power are increased. A DC-DC converter connected to the output stage of the rectifier circuit within the power receiving device operates such that the output voltage is constant with respect to the load on the power receiving end in order to make the load constant.

For this reason, power on the power receiving end becomes excessive as the transferring power is increased, so that the current flowing through the power transfer amplifier is reduced as input resistance of the DC-DC converter is increased. On the other hand, the foreign material such as the IC card has a different transmission frequency and does not operate as a circuit, and the current flows through a protective diode or the like when excessive input is applied to the rectifier circuit connected to the coil which is the power receiving antenna of the IC card, so that the current flowing through the power transfer amplifier is increased as the transferring power is increased.

In a case where the power source voltage is increased from approximately 4.5 V to 8 V, it can be seen from the drawing that the current flowing through the amplifier is reduced by approximately 110 mA when only the power receiving device is present, whereas the current flowing through the amplifier is reduced by approximately 95 mA when the power receiving device and the IC card are both present, meaning that the changed amount is smaller when the device and the IC card are present.

For this reason, by recognizing the change in current consumption of the power transfer amplifier when the power source voltage is changed during charging, foreign material detection can be performed even while transferring power.

Here, the value of the current consumed by the IC card is the difference between the current of the power transfer amplifier when only the power receiving device is placed on the power transfer coil 123 and the current when the power receiving device and the Type-A card are placed on the power transfer coil 123.

In the above-described manner, accuracy of detecting a foreign material such as the IC card 127 can be improved without needing to stop the charging operation during charging of the power receiving device. In addition, a toroidal core is unnecessary, meaning that no loss occurs in the toroidal core, and thus, the wireless power transfer device 100 with little loss can be achieved. Further, a large-sized electronic component such as the toroidal core is unnecessary, and thus, the wireless power transfer device 100 can be miniaturized.

Note that the above-described IC card 127 is the non-charging device; however, a mobile device or the like equipped with, for example, an IC card function not supporting wireless charging is also the non-charging device. In this case, the mobile phone equipped with the IC card function has the same circuit configuration as the IC card 127. For this reason, foreign material detection can be performed on such a mobile phone or the like as in the case of the IC card 127.

Second Embodiment

<Overview>

In FIG. 1, the first embodiment was described under the assumption that the pick-up coil is wound with, for example, three turns. In a second embodiment, a case where a pick-up coil wound with one turn is utilized will be described.

<Configuration Example and Operations of Wireless Power Transfer Device>

Figure 5:
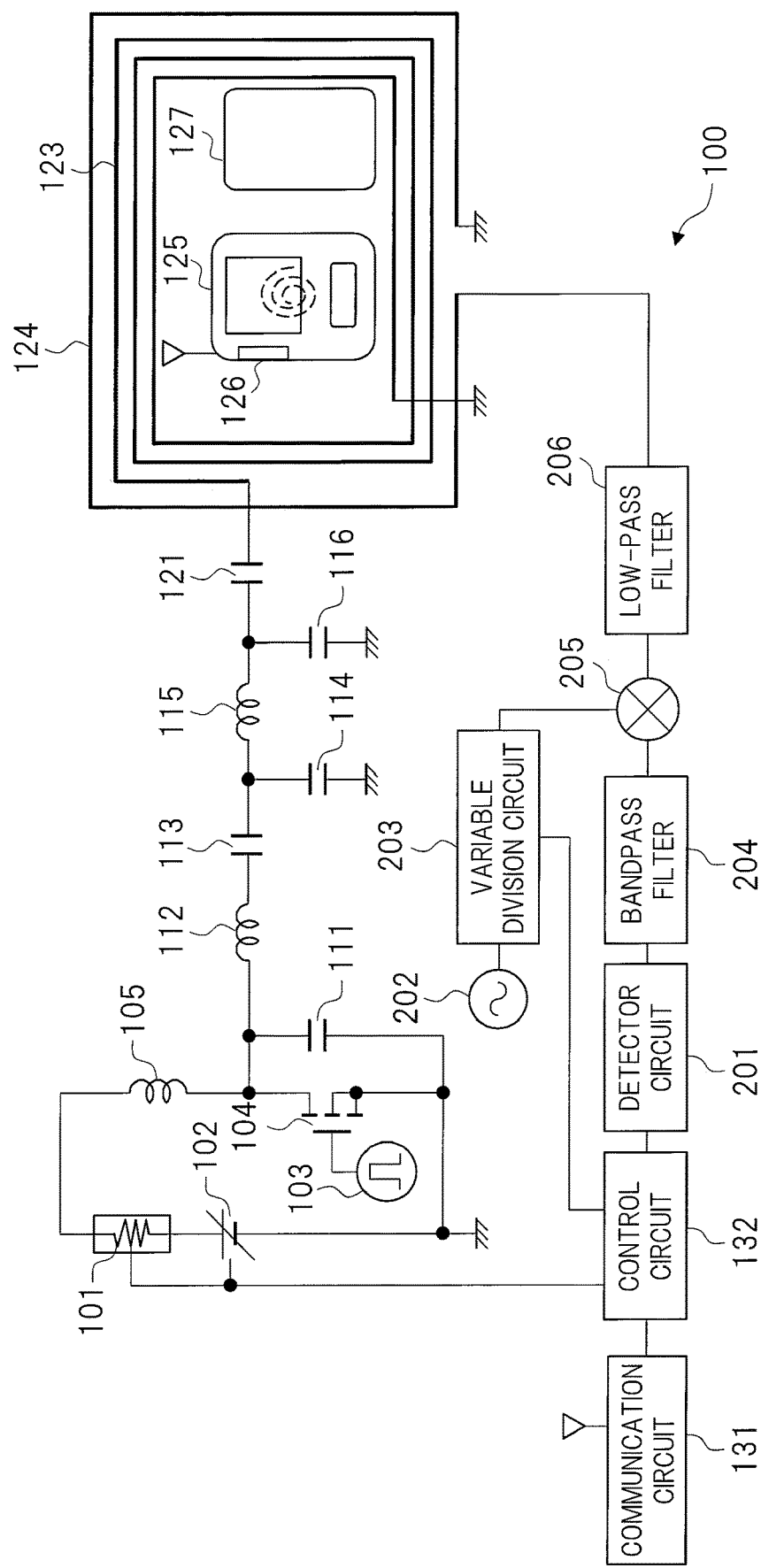
FIG. 5 is an explanatory drawing showing a configuration example of a wireless power transfer device according to a second embodiment.

FIG. 5 is an explanatory drawing showing a configuration example of the wireless power transfer device 100 according to a second embodiment.

In FIG. 5, components that perform the same operations as those of the first embodiment shown in FIG. 1 are denoted by the same reference signs, and redundant descriptions thereof will be omitted.

The wireless power transfer device 100 of FIG. 5 differs from that of the first embodiment shown in FIG. 1 in that an oscillator 202, a variable division circuit 203, a mixer circuit 205 and a low-pass filter 206 are newly added to the wireless power transfer device 100.

Further, the wireless power transfer device 100 of FIG. 5 differs from that of the first embodiment shown in FIG. 1 in that only one bandpass filter 204 and one detector circuit 201 are provided. In addition, the pick-up coil 124 wound with one turn is provided on an outer periphery of the power transfer coil 123. The low-pass filter 206 is a second filter unit. In addition, a signal conversion unit is constituted by the oscillator 202, the variable division circuit 203 and the mixer circuit 205.

An input unit of the low-pass filter 206 is connected to one end of the pick-up coil 124, and the mixer circuit 205 is connected to an output unit of the low-pass filter 206. In addition, an output unit of the variable division circuit 203 and the input unit of the bandpass filter 204 are each connected to the mixer circuit 205.

The oscillator 202 generates a clock signal. The clock signal generated by the oscillator 202 is transmitted to the variable division circuit 203. The variable division circuit 203 divides the clock signal and outputs this signal. A division ratio of the variable division circuit 203 can be set accordingly based on a division control signal transmitted from the control circuit 132.

Each harmonic component detected by the pick-up coil 124 is filtered by the low-pass filter 206 and then is converted into a certain intermediate frequency signal in the mixer circuit 205 by a local signal. The local signal is a signal in which the clock signal generated by the oscillator 202 is divided by the variable division circuit 203.

The intermediate frequency signal converted by the mixer circuit 205 is detected by the detector circuit 201 via the bandpass filter 204. As a result, the harmonic wave picked up by the pick-up coil 124 can be converted into a substantially constant frequency by the mixer circuit 205, so that a third-order or a greater harmonic wave can be detected.

In the above-described manner, the harmonic wave can be detected at a wider range by providing the pick-up coil 124 wound with one turn outside the power transfer coil 123.

Third Embodiment

<Overview>

A third embodiment comprises a plurality of pick-up coils, and here, a technique of selecting a pick-up coil suitable for measuring the harmonic wave will be described.

With this configuration, a range for detecting the mobile device which is the charging target device and the foreign material can be widened. In addition, it is possible to determine an approximate position of the mobile device placed in the charging area.

Note that the pick-up coil can detect the harmonic wave even if a degree of coupling with the power transfer coil and a detection level are low, so that loss is small even if the plurality of pick-up coils are provided.

<Configuration Example and Operation of Wireless Power Transfer Device>

Figure 6:
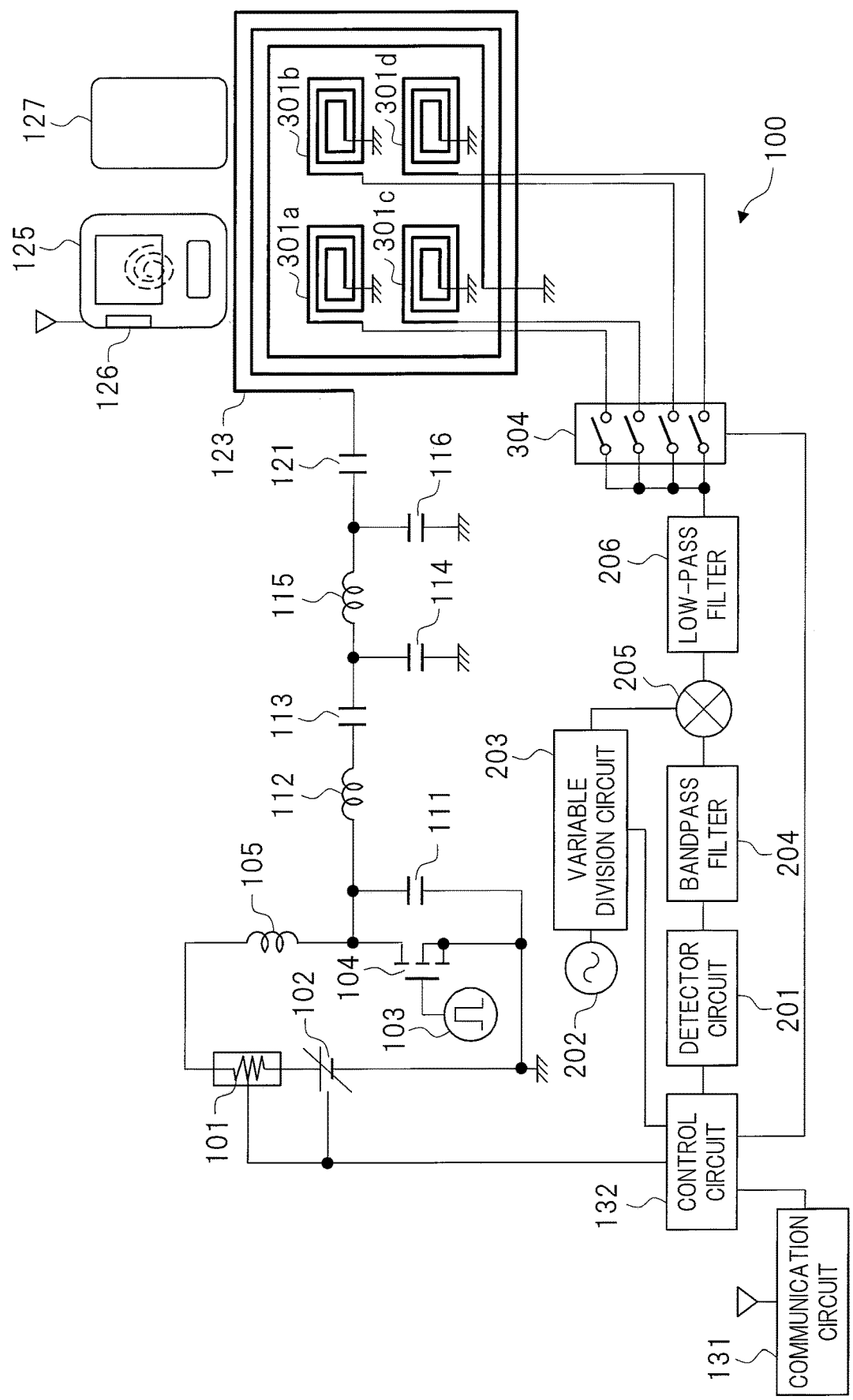
FIG. 6 is an explanatory drawing showing a configuration example of a wireless power transfer device according to a third embodiment.

FIG. 6 is an explanatory drawing showing a configuration example of the wireless power transfer device 100 according to the third embodiment. In FIG. 6, components that perform the same operations as those of the second embodiment of FIG. 5 are denoted by the same reference signs, and redundant descriptions thereof will be omitted.

The wireless power transfer device 100 of FIG. 6 differs from the wireless power transfer device 100 of FIG. 5 in that four pick-up coils 301a, 301b, 301c and 301d and a switch circuit 304 are newly provided to the wireless power transfer device 100 of FIG. 6.

Note that FIG. 6 has a configuration in which four pick-up coils are provided; however, the number of pick-up coils is not limited to this number and may be, for example, greater than or equal to five.

The pick-up coil 301a and the pick-up coil 301c are arranged in a vertical direction on the inner-left side of the power transfer coil 123. In addition, the pick-up coil 301b and the pick-up coil 301d are arranged in the vertical direction on the inner-right side of the power transfer coil 123.

Each of the pick-up coils 301a, 301b, 301c and 301d is connected to the switch circuit 304. The switch circuit 304 selects one of the pick-up coils 301a, 301b, 301c and 301d based on a switch control signal transmitted from the control circuit 132 and connects it to the low-pass filter 206.

The control circuit 132 sequentially switches the pick-up coil connected to the low-pass filter 206 according to the switch control signal. The harmonic wave picked up by the pick-up coil selected by the switch circuit 304 is detected by the detector circuit 201 via the low-pass filter 206, the mixer circuit 205 and the bandpass filter 204 as in the case of FIG. 5.

Then, the control circuit 132 compares the detection voltage detected by the detector circuit 201, so that the pick-up coil that detected the highest detection voltage can be determined. In this manner, the control circuit 132 can determine a position of the IC card 127, which is the non-charging device, placed on the charging pad from the result of the pick-up coil. Likewise, the control circuit 132 can determine a position of the mobile device 125 placed on the charging pad.

In the above-described manner, the configuration in which the plurality of pick-up coils are provided can further improve accuracy of detecting a foreign material. In addition, positions of the mobile device 125 and the IC card 127, which is the non-charging device, placed on the charging pad can be determined.

Fourth Embodiment

<Overview>

In a fourth embodiment, a technique of notifying whether or not charging (hereinafter referred to as proper charging) is being performed with a correct combination when a plurality of wireless power transfer devices and a plurality of mobile devices are provided will be described.

<Example of Charging>

Figure 7:
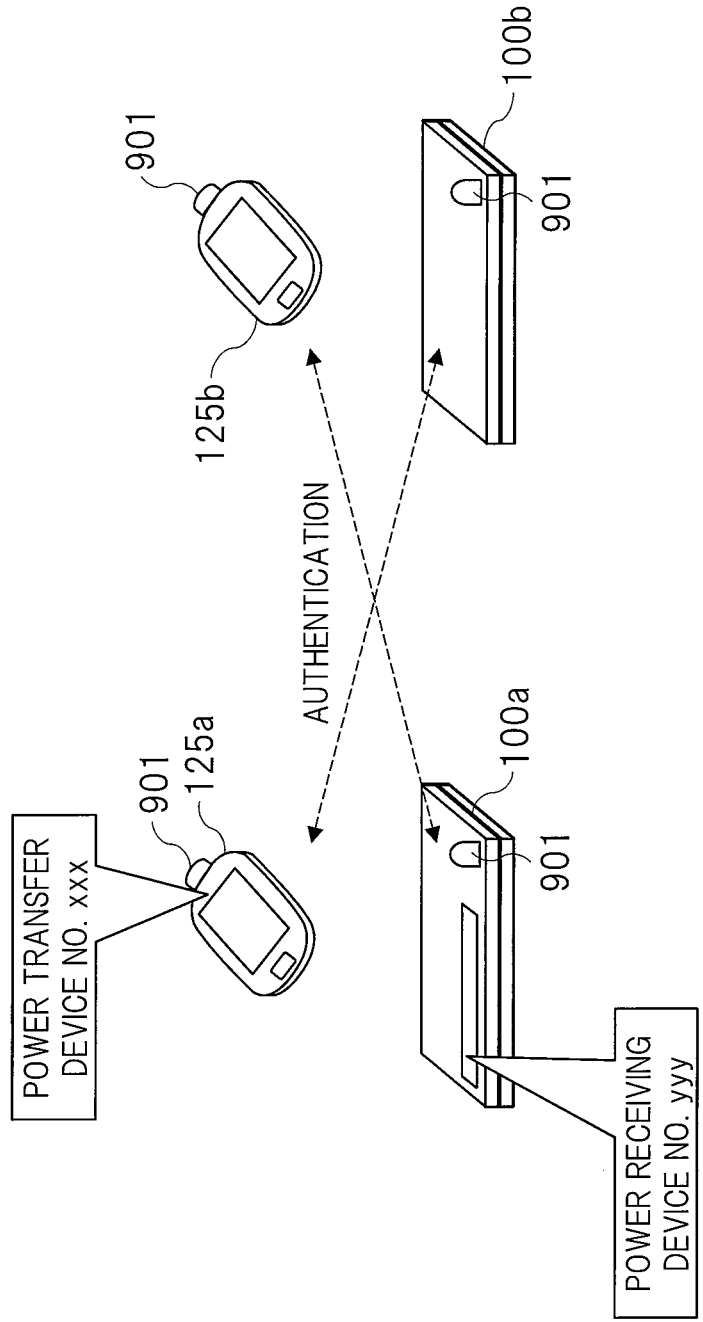
FIG. 7 is an explanatory drawing showing an example of charging performed by two wireless power transfer devices and two mobile devices according to a fourth embodiment.

FIG. 7 is an explanatory drawing showing an example of charging performed by two wireless power transfer devices 100a and 100b and two mobile devices 125a and 125b according to the fourth embodiment.

FIG. 7 shows a case where two mobile devices 125a and 125b are respectively charged by two wireless power transfer devices 100a and 100b. The mobile device 125a is a device to be charged by the wireless power transfer device 100a, and the mobile device 125b is a device to be charged by the wireless power transfer device 100b. In addition, a configuration of each of the wireless power transfer devices 100a and 100b is the same as that of the first embodiment shown in FIG. 1, and thus, redundant descriptions thereof will be omitted.

In FIG. 7, when charging is performed with the correct combination of the mobile device 125a and the wireless power transfer device 100a, that is, when proper charging is performed, the mobile device 125a and the wireless power transfer device 100a are allowed to perform wireless data communication with each other, so that each device can perform data communication to authenticate and control the corresponding device.

When the mobile device 125a and the wireless power transfer device 100a perform authentication and the mobile device 125a is then placed on the wireless power transfer device 100b, the mobile device 125a would not be properly charged since authentication is not performed between the mobile device 125a and the wireless power transfer device 100b. In this case, the user can tell that charging is not performed by an alert displayed on a display or the like within the mobile device 125a, indicating that charging will not performed.

However, when authentication between the mobile device 125a and the wireless power transfer device 100a and authentication between the mobile device 125b and the wireless power transfer device 100b are established and the mobile device 125b is then accidentally placed on the wireless power transfer device 100a, charging is started since both devices are in a state where charging is allowed.

As a result, a state where the mobile device 125a is charged by the wireless power transfer device 100b and where the mobile device 125b is charged by the wireless power transfer device 100a occurs. When charging of the mobile device 125a is completed in this state, the wireless power transfer device 100b would not recognize that charging of the mobile device 125a is completed and would continue charging. On the other hand, the wireless power transfer device 100a ends the charging without completing charging of the mobile device 125b.

In order to prevent such a problem from occurring, after authentication between the mobile device which is the charging target device and the wireless power transfer device is finished, a name of the corresponding device is displayed on each mobile device such that the user can recognize whether or not charging is being performed with the correct combination.

When authentication between the wireless power transfer device 100a and the mobile device 125a is finished, the control circuit 132 of the wireless power transfer device 100a sends, for example, information regarding the device name of the authenticated mobile device 125a to the mobile device 125a via the communication circuit 131.

The mobile device 125a displays the received device name and the like on a monitor (not shown) or the like within the mobile device 125a. Operations in the wireless power transfer device 100b and the mobile device 125b are performed in the same manner. As a result, the user can visually confirm that proper charging is being performed.

In addition, as shown in FIG. 7, a simple light emitting unit such as an LED 901 may be attached to each of the mobile devices 125a and 125b and wireless power transfer devices 100a and 100b. Each LED 901 simultaneously blinks or blinks in response, so that the user can recognize that the combination between the mobile device and the corresponding wireless power transfer device is correct.

<Example of Determining Proper Charging>

Next, a technique of determining whether or not proper charging is performed will be described.

Figure 8:
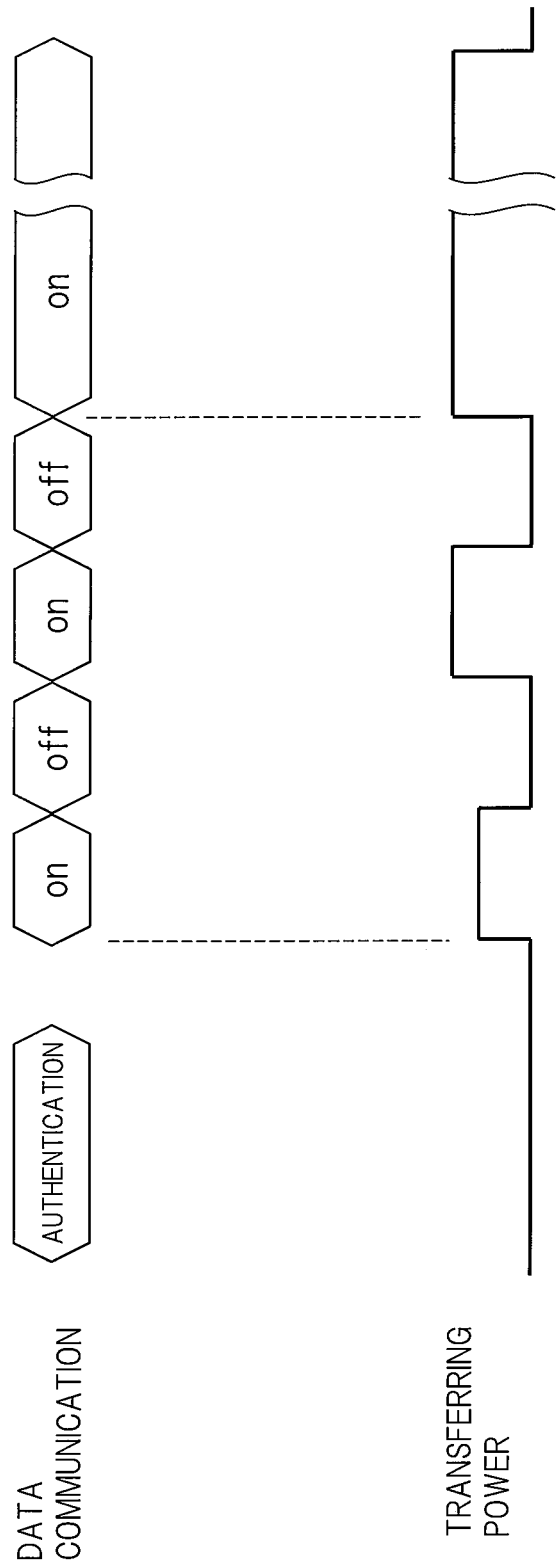
FIG. 8 is an explanatory drawing showing an example of data communication between the mobile device and the wireless power transfer device of FIG. 7 and timing of power transfer from the wireless power transfer device.

FIG. 8 is an explanatory drawing showing an example of data communication between the mobile device 125a and the wireless power transfer device 100a of FIG. 7 and timing of the power transfer from the wireless power transfer device. Note that FIG. 8 shows an example in regard to the mobile device 125a and the wireless power transfer device 100a; however, the same applies to the mobile device 125b and the wireless power transfer device 100b.

The process described below is operated mainly by the control circuit 132 shown in FIG. 1.

First, when charging of the wireless power transfer device 100a is started, authentication between the mobile device 125a and the wireless power transfer device 100a is performed via data communication. After authentication is established, information can be sent and received between the wireless power transfer device 100a and the mobile device 125a. Communication between the wireless power transfer device 100a and the mobile device 125a is performed via the communication circuit 131 and the communication circuit 126 of the first embodiment shown in FIG. 1.

After authentication is established, the wireless power transfer device 100a turns the power transfer on and off according to a predetermined timing. The power transfer may be turned on and off a number of times as shown in FIG. 8, or may be turned on and off by changing the magnitude of the power transferred.

The control circuit 132 of the wireless power transfer device 100a sends information of a start and finish timing along with a period in which power is transferred via data communication. The mobile device 125a confirms whether or not the power was appropriately received in accordance with the timing. This confirmation result is sent to the wireless power transfer device 100a.

Alternatively, when the wireless power transfer device 100a turns the power transfer on and off, the mobile device 125a on the power receiving end may return a response signal to the wireless power transfer device 100a at the timing of receiving the transferred power.

The control circuit 132 determines whether or not the response signal is returned based on the on or off timing of the power transfer and, if the timing of the response signal is correct, determines that the authenticated mobile device 125a is correctly placed in the vicinity of the charging pad.

In addition, the wireless power transfer device 100a may send information regarding a magnitude of the transferring power, measure a magnitude of the receiving power of the mobile device 125a on the power receiving end and appropriately control the magnitude of the transferring power, so that the magnitude of the receiving power becomes a target value.

In the above-described manner, improper charging can be reduced. In addition, power can be transferred and received appropriately, so that charging can be efficiently completed in a short amount of time.

Fifth Embodiment

<Overview>

In a fifth embodiment, a case where the wireless power transfer device 100 transfers power to a plurality of power receiving devices 350 will be described.

<Configuration Example of Wireless Power Transfer Device>

Figure 9:
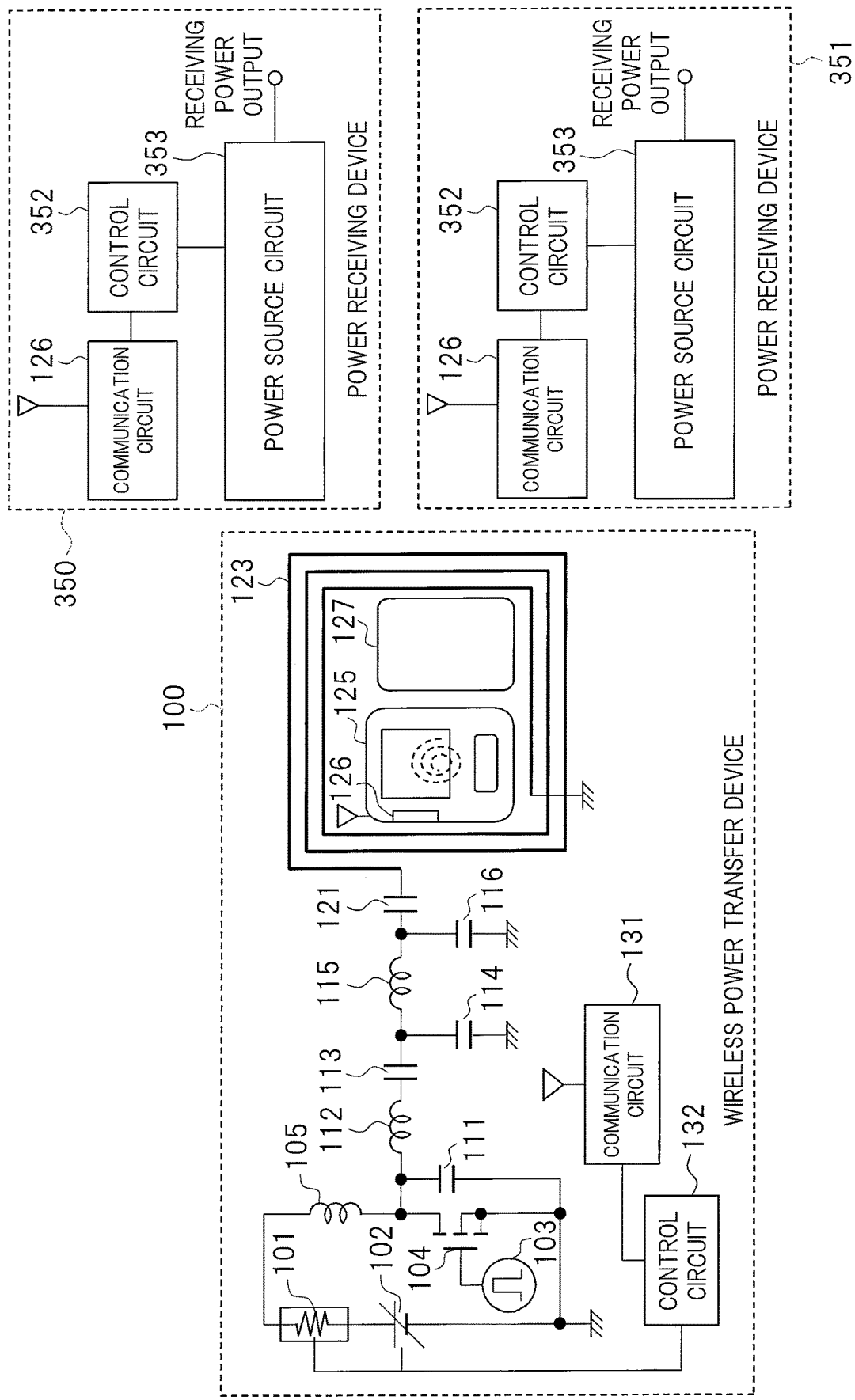
FIG. 9 is an explanatory drawing showing a configuration example of a wireless power transfer device according to a fifth embodiment.

FIG. 9 is an explanatory drawing showing a configuration example of the wireless power transfer device 100 according to the fifth embodiment.

FIG. 9 shows the wireless power transfer device 100 capable of supplying power to two power receiving devices and an example in which the two power receiving devices 350 and 351 are supplied with power by the wireless power transfer device 100.

As shown in FIG. 9, the wireless power transfer device 100 includes the current detector 101, the variable voltage power source 102, the field effect transistor 104, the choke coil 105, the electrostatic capacitors 111, 113, 114 and 116, the inductors 112 and 115, the resonant capacitor 121, the power transfer coil 123, the communication circuit 131 and the control circuit 132.

In addition, a power source unit is constituted by the current detector 101, the variable voltage power source 102, the field effect transistor 104, the choke coil 105, the electrostatic capacitors 111, 113, 114 and 116, the inductors 112 and 115, the resonant capacitor 121, the power transfer coil 123 and the pick-up coil 124.

The wireless power transfer device 100 shown in FIG. 9 differs from the wireless power transfer device 100 of the first embodiment shown in FIG. 1 in that the pick-up coil 124, the detector circuits 133, 134 and 135 and the bandpass filters 136, 137 and 138 shown in FIG. 1 are not provided. Other configurations are the same as those of the wireless power transfer device 100 of FIG. 1, and thus, redundant descriptions thereof will be omitted.

The power receiving device 350 is provided in the mobile device 125 or the like which is the charging target device shown in FIG. 1. As shown in the drawing, the power receiving device 350 includes the communication circuit 126, a control circuit 352 and a power source circuit 353.

As described with reference to FIG. 1, the communication circuit 126 performs communication with the communication circuit 131 within the wireless power transfer device 100. The control circuit 352 performs, for example, authentication as to whether or not the device is the charging target device and charging controls for the power source circuit 353 described below via the communication circuit 126.

The power source circuit 353 rectifies the signal transferred from the wireless power transfer device 100, converts it into a direct current voltage and supplies it to a battery (not shown) within the mobile device 125 to be used as a charging power source.

Here, the power receiving device 350 is described; however, as in the power receiving device 350, the power receiving device 351 also has a configuration that includes the communication circuit 126, the control circuit 352 and the power source circuit 353.

<Example of Charging Operation>
Next, a charging operation performed by the wireless power transfer device 100 will be described.

First, when the power receiving device 350 enters a communication range of the communication circuit 131 of the wireless power transfer device 100, the control circuit 352 of the power receiving device 350 performs data communication with the control circuit 132 via the communication circuit 126 and the communication circuit 131 of the wireless power transfer device 100.

Here, the power receiving device 350, that is, the mobile device 125, is in a state where charging is necessary. The power transfer device 100 having obtained this information from the power receiving device 350 via communication supplies power to the power receiving device 350.

The communication circuit 131 is allowed to communicate with a plurality of communication circuits by, for example, time division, and is allowed to communicate with another power receiving device even if the communication circuit 131 is communicating with the communication circuit 126. For example, when another power receiving device 351 enters the communication range of the communication circuit 131 while the communication circuit 131 is communicating with the communication circuit 126, the communication circuit 131 is allowed to communicate with the communication circuit 126 of the power receiving device 351.

As described above, the wireless power transfer device 100 can supply power to each of the two power receiving devices, and in a case where it is decided that charging of the power receiving device 351 is necessary based on the communication with the communication circuit 126 of the power receiving device 351, the wireless power transfer device 100 supplies power to the power receiving device 351 as well.

Here, the wireless power transfer device 100 may supply power to the power receiving device 350 and the power receiving device 351 almost simultaneously, or may supply power by switching between the power receiving device 350 and the power receiving device 351 with using time division.

Figure 10:
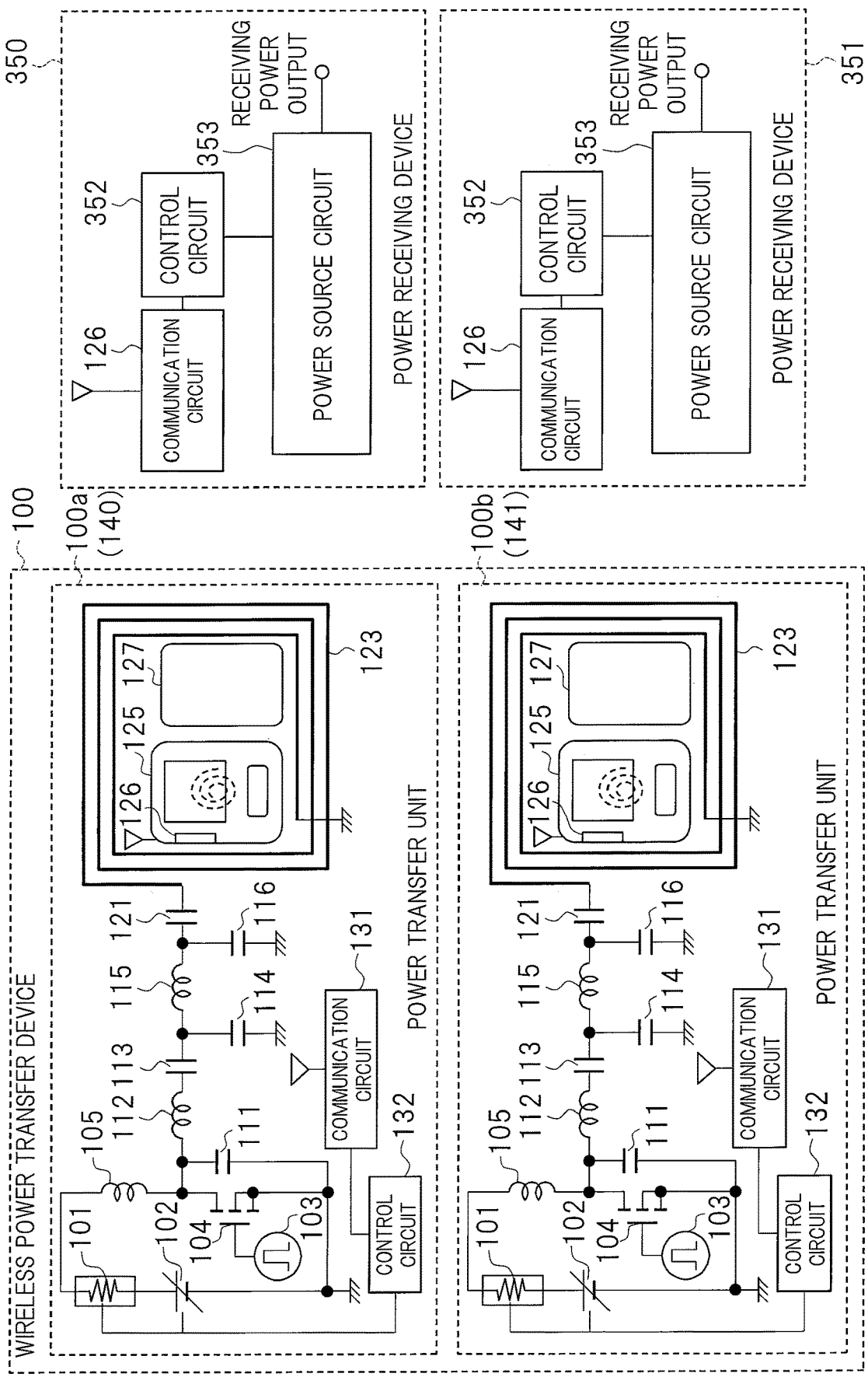
FIG. 10 is an explanatory drawing showing another configuration example of the wireless power transfer device of FIG. 9.

FIG. 10 is an explanatory drawing showing another configuration example of the wireless power transfer device 100 of FIG. 9.

FIG. 10 shows an example in which communication with the two power receiving devices 350 and 351 is not performed by time division but is performed almost simultaneously, so that the two power receiving devices 350 and 351 can be supplied with power almost simultaneously.

In this case, the wireless power transfer device 100 includes two power transfer units 140 and 141. The configuration of each of the power transfer units 140 and 141 is the same as that of the wireless power transfer device 100 of FIG. 9.

Namely, each of the power transfer units 140 and 141 includes the current detector 101, the variable voltage power source 102, the field effect transistor 104, the choke coil 105, the electrostatic capacitors 111, 113, 114 and 116, the inductors 112 and 115, the resonant capacitor 121, the power transfer coil 123, the communication circuit 131 and the control circuit 132.

Thus, by providing two power transfer units 140 and 141, communication can be performed with the two power receiving devices 350 and 351 almost simultaneously, and further, power can be supplied to the two power receiving devices 350 and 351 almost simultaneously. Note that the number of power transfer units in the wireless power transfer device 100 is not limited, and the wireless power transfer device 100 may have a configuration in which, for example, three or more power transfer units are provided.

Based on the communication between the power transfer units 140 and 141 and the control circuit 132 of the wireless power transfer device 100 via the communication circuit 131 within each of the power transfer units 140 and 141, a charging status of each of the power receiving devices 350 and 351 can be confirmed such that power is supplied to the power receiving devices 350 and 351 as necessary.

With such a configuration, power can be supplied to the power receiving devices 350 and 351 almost simultaneously as described above. In addition, power can be supplied individually according to each of the power receiving devices 350 and 351. In this manner, charging can be performed efficiently in a short amount of time. Note that power supply operations of the power transfer units 140 and 141 are controlled by control units (not shown).

Figure 11:
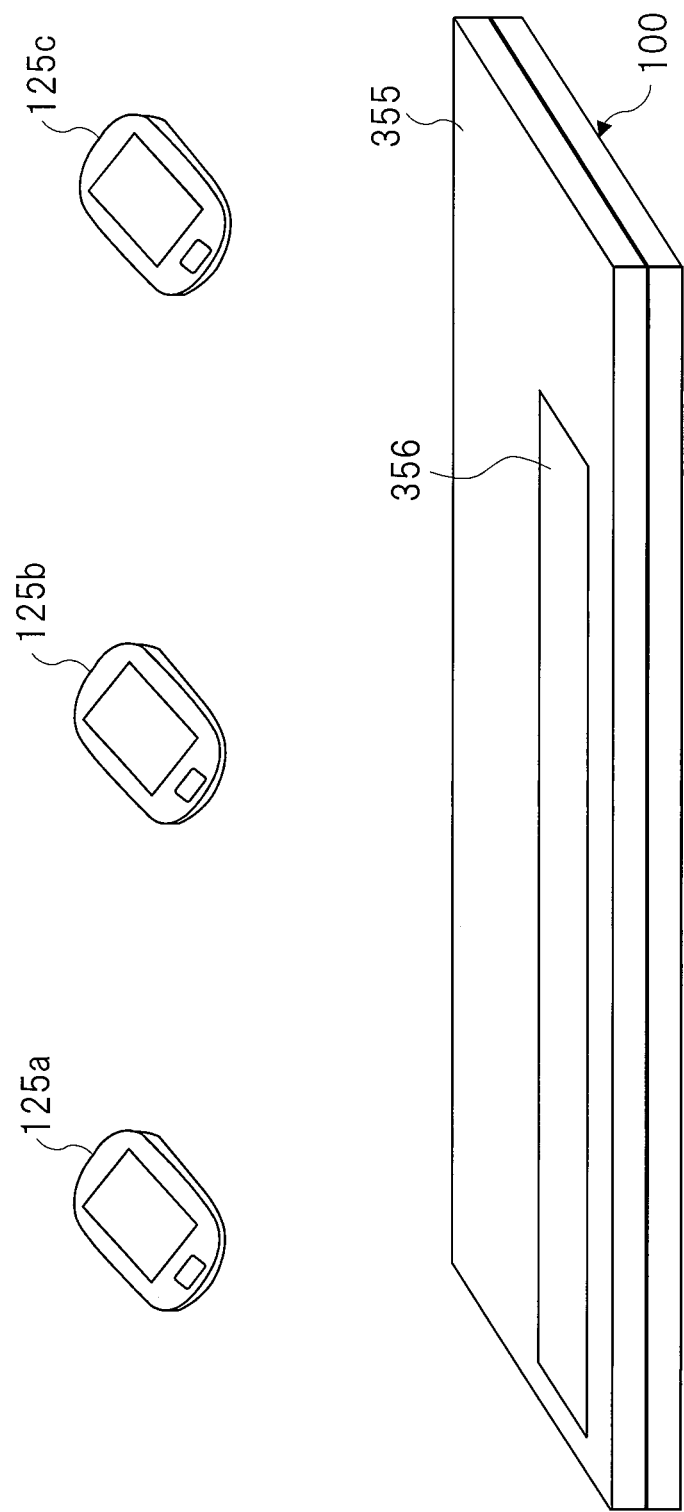
FIG. 11 is an explanatory drawing showing an example of usage of the wireless power transfer device of FIG. 9.

FIG. 11 is an explanatory drawing showing an example of usage of the wireless power transfer device 100 of FIG. 9.

FIG. 11 shows the wireless power transfer device 100 capable of supplying power to two charging target devices, and shows a case where mobile devices 125a to 125c which are three charging target devices, exceeding the number of devices to which the wireless power transfer device 100 can supply power, are requesting charging to the wireless power transfer device 100. In addition, the power receiving device 350 of FIG. 9 is provided in each of the mobile devices 125a to 125c.

In the wireless power transfer device 100, a surface of a power supplying pad 355 on which the mobile device 125 is placed when being charged is provided with a display unit 356 such as a touch panel or a liquid-crystal display.

Here, the mobile device 125 which is the charging target device is not particularly limited to a communication device such as a mobile phone, a smartphone or a tablet computer, and may be a smartwatch, a medical support device such as a hearing aid, a power tool, a rechargeable battery or the like.

As described above, the wireless power transfer device 100 shown in FIG. 11 is capable of supplying power to two mobile devices. When, for example, the mobile device 125a and the mobile device 125b are placed on the power supplying pad 355, the wireless power transfer device 100 can supply power to each of the mobile devices 125a and 125b by performing communication with the mobile device 125a and the mobile device 125b.

Subsequently, when the mobile device 125c is additionally placed on the power supplying pad 355 for charging, the wireless power transfer device 100 recognizes that the mobile device 125c needs to be charged by communicating with the mobile device 125c.

However, since the number of mobile devices exceeds the number of devices to which the wireless power transfer device 100 can supply power, power cannot be supplied to the mobile device 125c. Therefore, the wireless power transfer device 100 performs a selection process of selecting the mobile device to be supplied with power.

<Example of Selection Process of Charging Target Device>

Figure 12:
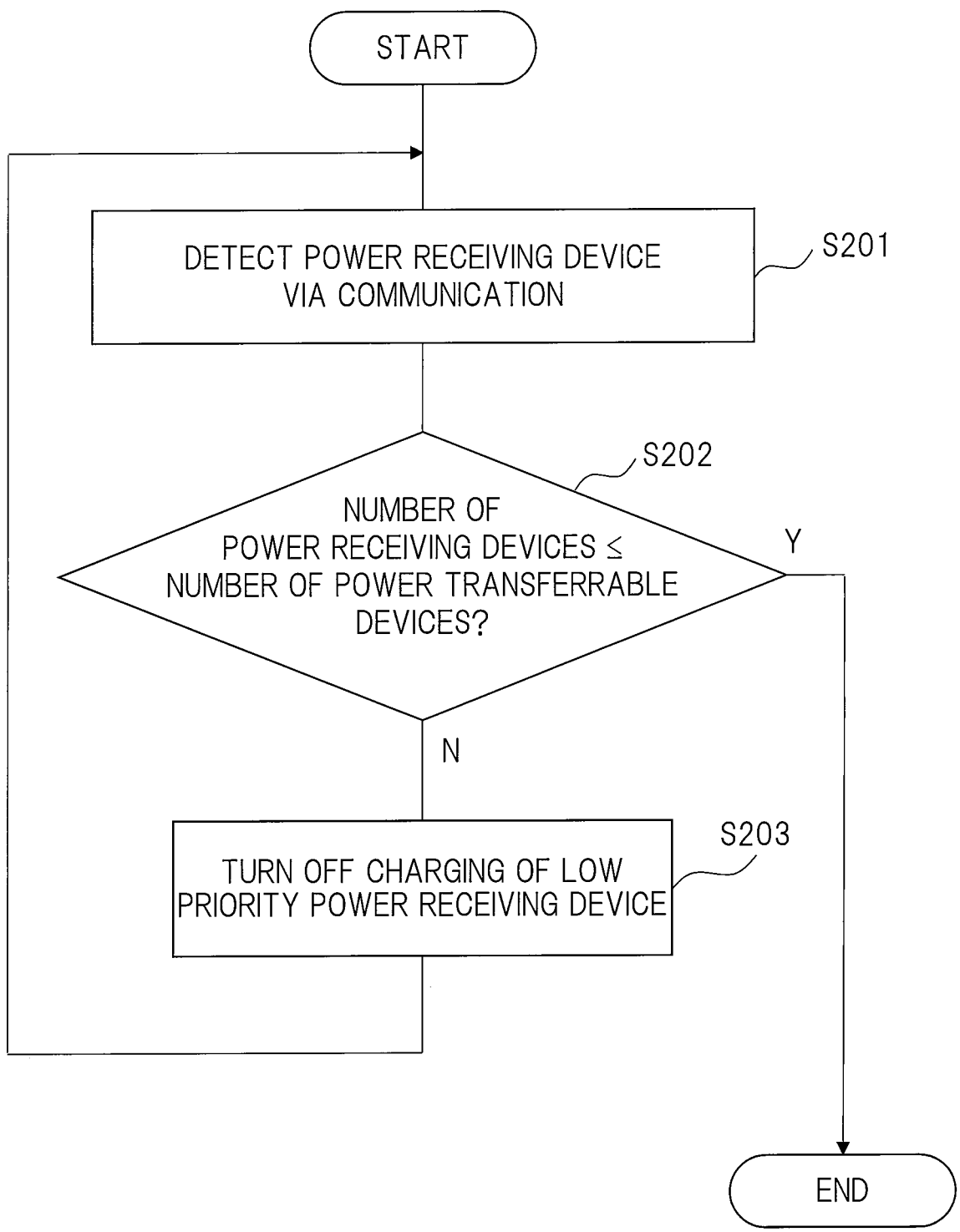
FIG. 12 is a flowchart showing an example of a selection process of a mobile device when the number of mobile devices exceeds the number of devices to which the wireless power transfer device of FIG. 9 can supply power.

FIG. 12 is a flowchart showing an example of the selection process of the mobile device when the number of mobile devices exceeds the number of devices to which the wireless power transfer device 100 of FIG. 9 can supply power.

First, the control circuit 132 of the wireless power transfer device 100 detects the number of mobile devices 125 placed on the power supplying pad 355 (step S201). This number is detected by the control circuit 132 communicating with the control circuit 352 within the power receiving device 350 of each of the mobile devices 125 and authentication performed between the wireless power transfer device 100 and the mobile device 125.

From the result of the detection process of step S201, the control circuit 132 determines whether or not the number of detected devices is equal to the number of devices to which the wireless power transfer device 100 can supply power (step S202). In the process of step S202, if the number of mobile devices 125 placed on the power supplying pad 355 is equal to the predetermined number of devices to which the wireless power transfer device 100 can supply power, the process ends.

On the other hand, in the process of step S202, if the number of mobile devices 125 exceeds the number of devices to which the wireless power transfer device 100 can supply power, two mobile devices which in this case is the number of devices to which the wireless power transfer device 100 can supply power are selected, and charging of the remaining mobile device is turned off (step S203). In order to turn off charging of the mobile device 125, the control circuit 132 sends, for example, a control signal which turns off the charging operation to the control circuit 352 of the mobile device 125 which is a target to be turned off from charging.

<Example of Prioritized Charging>

Here, an example of a power supply operation in the selected mobile device performed when the number of mobile devices exceeds the number of devices to which the wireless power transfer device can supply power will be described.

Selection of the mobile device to be supplied with power is determined based on order of priority and the like given to the mobile devices. For example, among the mobile devices 125a to 125c, the mobile device having the least remaining battery power is prioritized and charged.

The remaining battery power can be confirmed by the control circuit 132 sending an inquiry regarding the remaining battery power to the control circuit 352 of each of the mobile devices 125a to 125c via, for example, the communication circuit 131 and the communication circuit 126. Thus, charging of the mobile device having the largest remaining battery power among the mobile devices 125a to 125c is cancelled.

Alternatively, the mobile device to be supplied with power may be selected according to the battery charging time instead of the remaining battery power. For example, the control circuit 132 collects information regarding charging completion time of the battery from each of the control circuits 352 via the communication circuit 131 and communication circuit 126.

Based on the collected results, the control circuit 132 cancels charging of the mobile device having the shortest charging time among the mobile devices 125a to 125c. Namely, the mobile device having a battery with a longer charging time is prioritized.

In addition, when charging of the mobile device given a higher order of priority is completed, the control circuit 132 ends the charging operation of the power receiving device 350 having completed the charging, and thereafter, starts a power supplying process of the mobile devices not yet charged.

In this case, the control circuit 132 sends a control signal to the control circuit 352 of the power receiving device 350 having completed charging of the mobile device given the higher order of priority to end the charging operation. In addition, the control circuit 132 sends a control signal which starts the charging operation to the control circuit 352 of the power receiving device 350 within the mobile devices not yet charged.

Here, the display unit 356 may display the remaining amount of the battery in each of the mobile devices 125a to 125c, the time necessary to complete charging of the battery, or the like. In addition, the display unit 356 may display information such as which mobile device is being supplied with power during charging. In this manner, the user can easily confirm whether or not the desired mobile device is being supplied with power.

In addition, power may be supplied by prioritizing the mobile device with the largest remaining battery power instead of the least remaining battery power. Alternatively, power may be supplied by prioritizing the mobile device with the shortest charging time.

By giving such an order of priority to the mobile devices, charging of the mobile device can be completed quickly, so that the mobile device becomes usable in a short amount of time.

In addition, the charging target device may be classified into classes and be charged according to the order of priority given to each class. The class indicating the order of priority is assigned to each charging target device.

The wireless power transfer device 100 obtains information of the class indicating the order of priority from the charging target device via communication and determines the charging target device to be supplied with power based on the information of the class.

For example, each charging target device is classified depending on its type, such as mobile phones classified under Class 1, smartwatches classified under Class 2 and game consoles classified under Class 3, and it is considered that the devices under the classes with a smaller number have a higher order of priority.

Settings of the class of the charging target device may be set by the user when the wireless power transfer device 100 initially authenticates the charging target device.

Alternatively, the class may be preassigned to the charging target device.

Subsequently, the charging target device being supplied with power is displayed on the display unit 356 such that the user can easily confirm that the desired device is being supplied with power.

Figure 13:
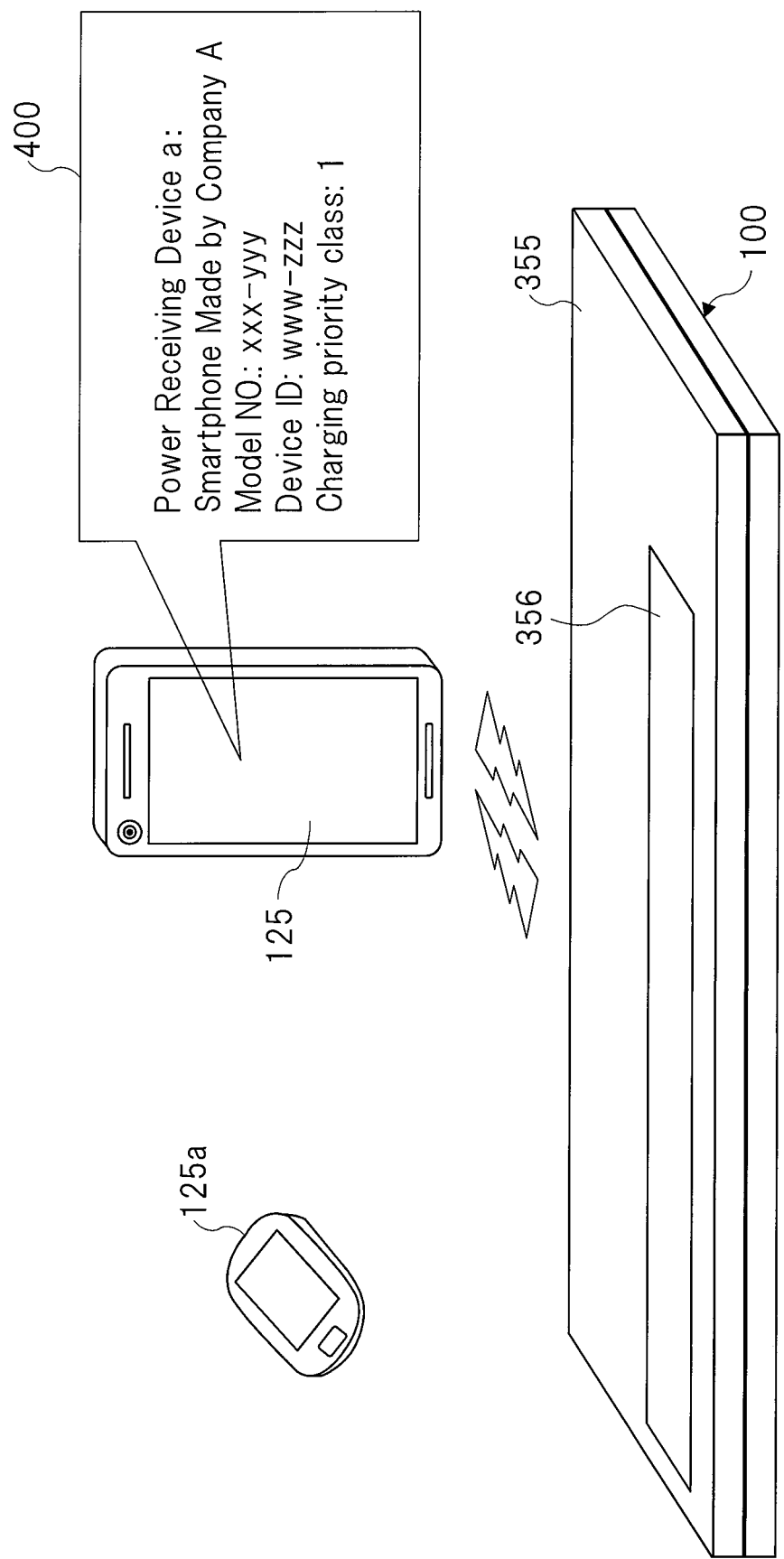
FIG. 13 is an explanatory drawing showing an example of registration of the mobile device performed by the wireless power transfer device of FIG. 11.

FIG. 13 is an explanatory drawing showing an example of registration of the mobile device 125 performed by the wireless power transfer device 100 of FIG. 11. The following process is a process performed mainly by the control circuit 132 within the wireless power transfer device 100.

FIG. 13 shows an example in which the wireless power transfer device 100 recognizes the mobile device 125 for the first time and registers the mobile device 125.

When the mobile device 125 is placed on the power supplying pad 355, the wireless power transfer device 100 and the power receiving device 350 of the mobile device 125 start communication via the communication circuits 131 and 126 and perform authentication as to whether or not the mobile device 125 is a charging target device.

At this time, when it is determined that the mobile device 125 is being authenticated for the first time, a registration process of the mobile device 125 is executed.

First, the control circuit 132 of the wireless power transfer device 100 and the control circuit 352 of the power receiving device 350 send information of each of the devices to each other via communication performed by the communication circuits 131 and 126. Here, the mobile device 125 is a smartphone as shown in the upper right of FIG. 13. In addition, an example of information 400 displayed on the display unit of the smartphone is shown to the right of the smartphone. The information 400 includes device information sent from the smartphone. The information shows that the smartphone placed on the power supplying pad 355 is made by "Company A" and has a model number of "xxx-yyy" and a device ID of "www-zzz".

The information 400 to be displayed on the display unit of the smartphone further includes items for setting a charging priority class to which the smartphone is assigned. The user can freely set the charging priority class by entering the class with using a virtual keyboard or the like displayed on the display unit of the smartphone. FIG. 13 shows an example in which the user has set the charging priority class to "1" in the information 400.

Data of the priority class set by the user is stored in a memory (not shown) or the like within the control circuit 352 of the power receiving device 350 and is sent to the control circuit 132 of the wireless power transfer device 100 via the communication circuits 131 and 126. The control circuit 132 associates the received data of the priority class with the information 400 and stores the data in a memory (not shown) or the like within the control circuit 132.

FIG. 13 shows an example in which the user sets the priority class; however, in the case where the charging priority class is preassigned to the power receiving device 350 of the mobile device 125 as described above, it may be configured such that only the priority class is displayed. Alternatively, it may be configured such that the user is allowed to freely change the preassigned priority class.

In this case, the data of the priority class is stored in, for example, the memory (not shown) or the like within the control circuit 352 of the power receiving device 350. Alternatively, a memory for storing the data of the priority class can be additionally provided in the power receiving device 350.

At the time of initial communication, the information 400 is associated with the device ID of the mobile device and is registered, so that when charging the mobile device for a second time and thereafter, the wireless power transfer device 100 can confirm the device ID of the charging device and can recognize the priority class of the mobile device. In addition, the device information including the priority class can be displayed on the display unit of the mobile device, that is, the smartphone in the example of FIG. 13.

The above-described information 400 may be displayed on, for example, the wireless power transfer device 100 instead of on the smartphone side. In this case, the wireless power transfer device 100 is provided with a display unit for displaying the information of the recognized charging target device such as the smartphone and input means such as a touch operation, so that the priority class of the charging target device can be set by the user.

<Example of Charging Operation>

Figure 14:
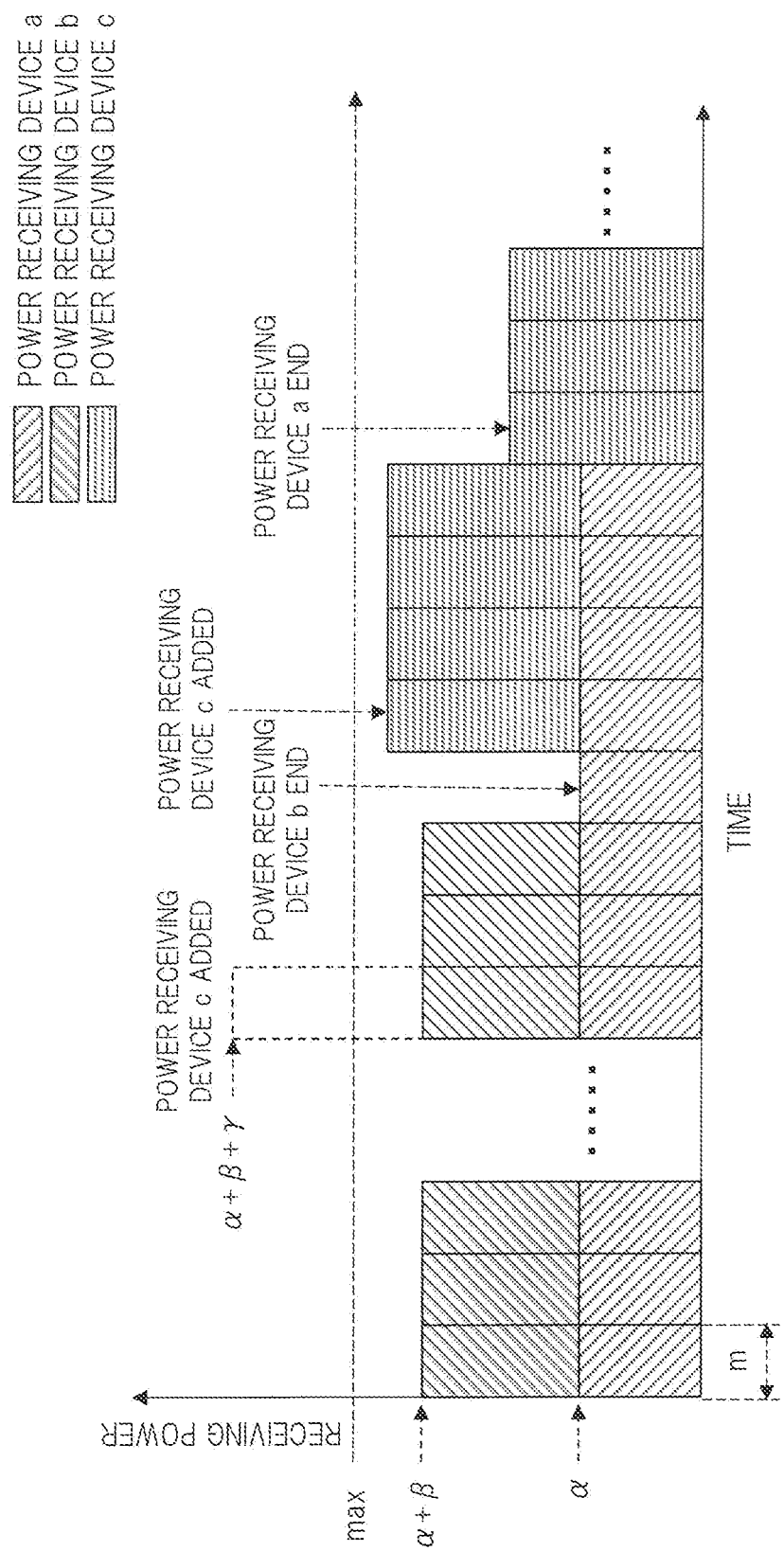
FIG. 14 is an explanatory drawing showing an example of a charging operation performed by the wireless power transfer device of FIG. 9.

FIG. 14 is an explanatory drawing showing an example of a charging operation performed by the wireless power transfer device 100 of FIG. 9. FIG. 14 shows an operation where charging of three mobile devices 125 is performed by the wireless power transfer device 100 of FIG. 9.

The vertical axis of the graph shown in FIG. 14 indicates a total amount of the power sent from the wireless power transfer device 100 to the three mobile devices, and a maximum power that can be sent from the wireless power transfer device 100 to the power receiving device of each of the three mobile devices is denoted as "max". The horizontal axis indicates transition of time.

The graph shows an example in which a power transfer operation is performed with using a unit of time m for the sake of clarity. Here, power $\alpha$ is the power necessary to charge a power receiving device a within a first mobile device, power $\beta$ is the power necessary to charge a power receiving device b within a second mobile device, and power $\gamma$ is the power necessary to charge a power receiving device c within a third mobile device.

If $\alpha+\beta$ is less than max, the value is within the range of the power transmittable from the wireless power transfer device 100, and thus, power equal to $\alpha+\beta$ is transferred. If the power receiving device c requiring power $\gamma$ is added and the total of $\alpha+\beta+\gamma$ becomes greater than max, the necessary power cannot be transmitted from the wireless power transfer device 100.

For this reason, the charging operation of the power receiving device c is stopped, so that the power receiving device c cannot receive power and power is sent to the power receiving device a and the power receiving device b. Stopping of the power receiving device c is performed by, for example, the control circuit 132 sending a control signal which stops the operation of the power receiving device c to the power receiving device c.

Then, when charging of the power receiving device b is completed, so that power β becomes unnecessary and α+γ becomes less than max, power of α+γ is transferred to the power receiving device a and the power receiving device c. Further, after charging of the power receiving device a is completed, charging is performed only on the power receiving device c.

Through such controls, a large number of mobile devices within the number of devices to which the wireless power transfer device 100 can transfer power can be efficiently charged.

Figure 15:
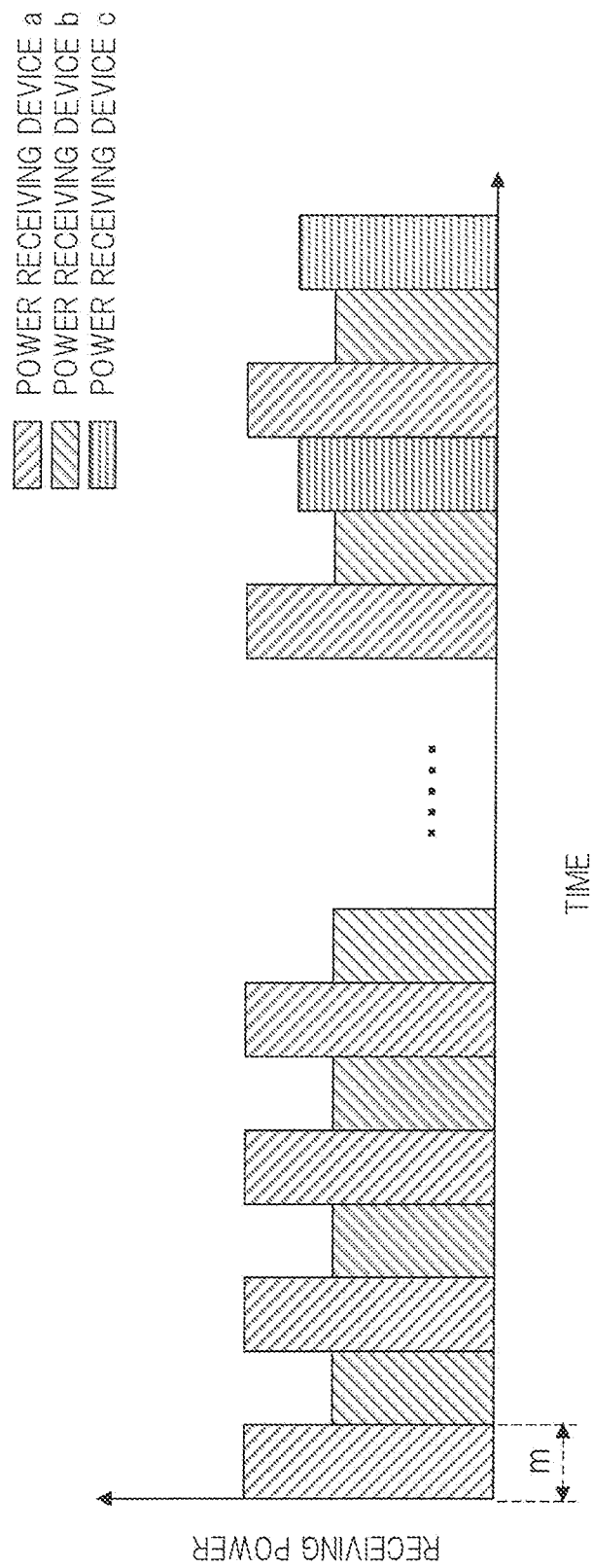
FIG. 15 is an explanatory drawing showing an example of a charging operation performed by the wireless power transfer device of FIG. 9.

FIG. 15 is an explanatory drawing showing an example of the charging operation performed by the wireless power transfer device 100 of FIG. 9.

FIG. 15 shows a case where the wireless power transfer device 100 is capable of charging up to three mobile devices and power is supplied to the three mobile devices. The power receiving devices a to c in the drawing are the power receiving devices within the three mobile devices.

The horizontal axis of the graph of FIG. 15 indicates a time course of the charging operation, and the vertical axis indicates a magnitude of the receiving power. Here, the receiving power of each of the power receiving devices a to c is supplied to each of the power receiving devices a to c with the highest efficiency.

FIG. 15 shows a charging operation in this case in which power is first supplied to the power receiving device a and the power receiving device b by time division as shown on the left side of FIG. 15 and charging of the third power receiving device c is added thereafter.

Here, the power received by the power receiving device a is the highest, the power received by the power receiving device b is the lowest, and the power received by the power receiving device c is lower than that of the power receiving device a and is higher than that of the power receiving device c.

In addition, a power supplying time of each of the power receiving devices a to c is time m. FIG. 15 shows an example in which the wireless power transfer device 100 performs communication with the power receiving devices a, b and c during time m and charging is performed on each of the power receiving devices a, b and c for the same amount of time, that is, for time m, while switching between the power receiving devices a, b and c.

FIG. 16 is an explanatory drawing showing an example of charging information displayed on the display unit 356 within the wireless power transfer device 100.

FIG. 16 shows a display example of charging information displayed on the display unit 356 within the wireless power transfer device 100 in a time zone shown on the left side of FIG. 15.

In the time zone shown on the left side of FIG. 15, power is supplied to the power receiving device a and the power receiving device b, and, as shown in FIG. 16, a time to complete charging of the power receiving device a, that is, the second mobile device, and on/off information indicating whether or not power is being supplied to the power receiving devices a and b are displayed on the display unit 356 as charging information.

FIG. 16 shows that the time to complete charging of the first mobile device, that is, the power receiving device a, is 60 minutes, and the time to complete charging of the second mobile device, that is, the power receiving device b, is 30 minutes.

In addition, "on" indicating that power is being supplied is displayed on each of the power receiving devices a and b. Other information such as the remaining battery power of the mobile device 125 may also be displayed on each of the power receiving devices a and b.

Next, as shown on the right side of FIG. 15, when the third mobile device, that is, the power receiving device c, is added, the wireless power transfer device 100 performs communication with the power receiving device c, and when the wireless power transfer device 100 recognizes that power needs to be supplied to the power receiving device c, supplying of power is performed for time m as in the case of the power receiving devices a and b.

FIG. 17 is an explanatory drawing showing a display example of the charging information continued from FIG. 16 and shows a display example of charging information displayed on the display unit 356 when charging of the third mobile device is started.

As shown in the drawing, when supplying of power to the third power receiving device c, that is, the third mobile device, is started, "15" minutes which is the time to complete charging of the power receiving device c and "on" indicating that power is being supplied is displayed on the display unit 356.

Here, when a fourth mobile device, that is, a power receiving device d, is added, since the number of devices to which the wireless power transfer device 100 can supply power is exceeded, power is not supplied to the power receiving device d, and "off" indicating that power is not being supplied to the power receiving device d is displayed on the display unit 356 as shown in FIG. 17.

Figure 18:
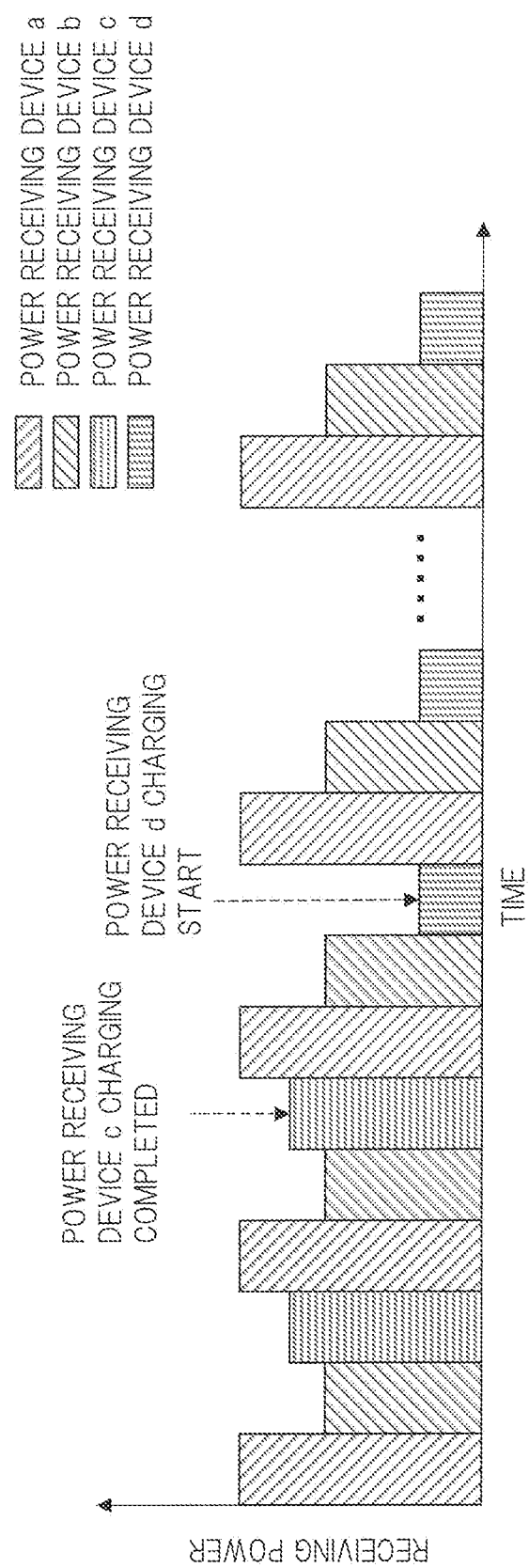
FIG. 18 is an explanatory drawing continued from FIG. 15.

FIG. 18 is an explanatory drawing continued from FIG. 15.

The left side of FIG. 18 shows that supplying of power to the power receiving device c is completed and supplying of power to the power receiving device d is started.

In addition, FIG. 19 is an explanatory drawing showing a display example of the charging information displayed on the display unit 356 within the wireless power transfer device 100 of FIG. 11 when supplying of power to the power receiving device c is completed. FIG. 20 is an explanatory drawing showing a display example of charging information continued from FIG. 19.

When supplying of power to the power receiving device c is completed, the wireless power transfer device 100 becomes capable of supplying power to the power receiving devices a, b and d. Thus, after supplying power to the power receiving device c is completed, supplying of power to the power receiving device d is started.

When supplying of power to the power receiving device c is completed, "0" minutes for the remaining charging time of the power receiving device c and "on→off" indicating that a power supplying status has transitioned from on to off are displayed on the display unit 356 as shown in FIG. 19.

Then, when supplying of power to the power receiving device d is started, "10" minutes for the remaining charging time of the power receiving device d and "off→on" indicating that the power supplying status has transitioned from off to on are displayed on the display unit 356 as shown in FIG. 20.

In this manner, power can be efficiently supplied to all power receiving devices even if the number of mobile devices to be charged exceeds the number of devices to which the wireless power transfer device 100 can supply power.

Figure 21:
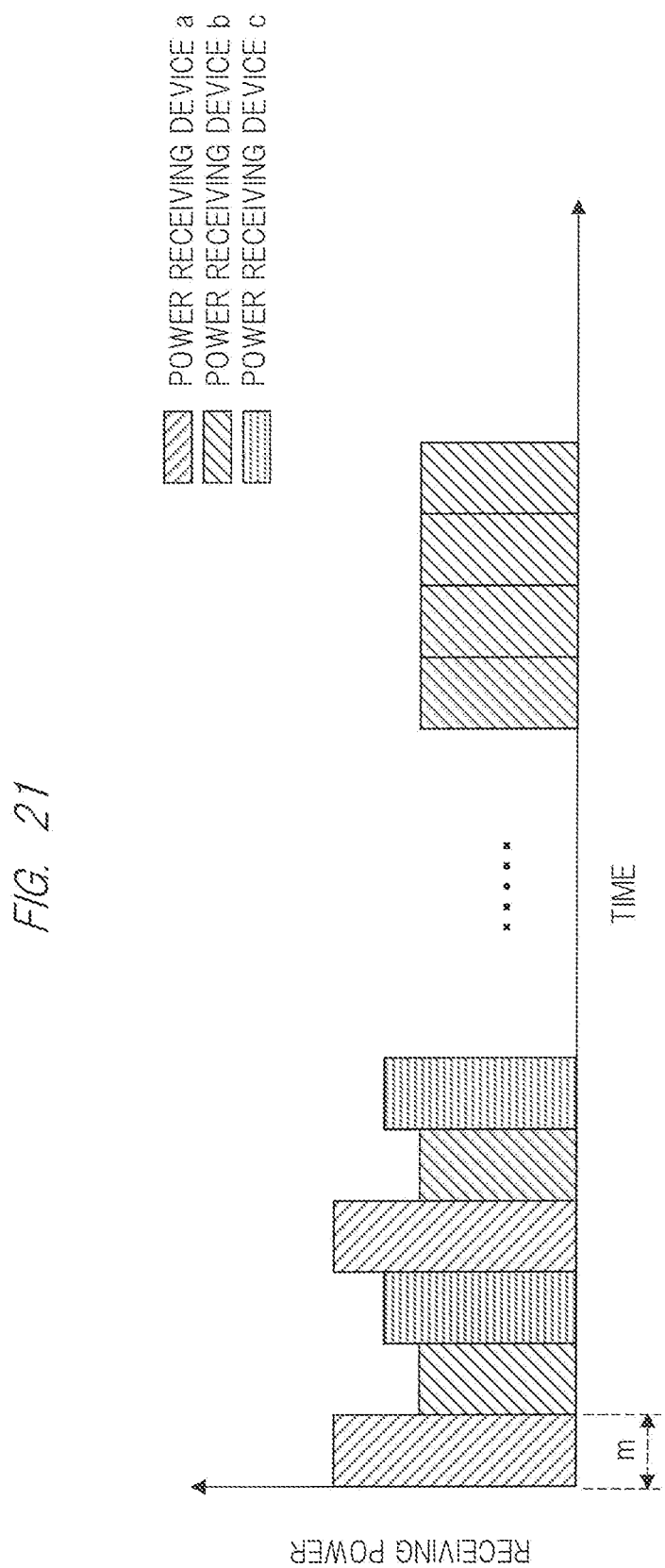
FIG. 21 is an explanatory drawing showing another example of a charging operation performed by the wireless power transfer device of FIG. 9.

FIG. 21 is an explanatory drawing showing another example of a charging operation performed by the wireless power transfer device 100 of FIG. 9.

FIG. 21 shows an example in which the user freely selects a power receiving device, that is, a mobile device among the three mobile devices, and the selected mobile device is prioritized and charged.

The drawing shows a state where each of the three mobile devices need to be charged, that is, a state where the power receiving devices a, b and c within the respective mobile devices need to be supplied with power, and where power is being supplied to the power receiving devices a to c for the same amount of time m in minutes.

Here, the user selects the power receiving device b to be prioritized and charged by, for example, touching the display of the display unit 356. In this case, the display unit 356 is a touch panel and is a selection unit.

The control circuit 132 of the wireless power transfer device 100 sends control signals which stop operations of the power receiving devices a and c not selected to be prioritized and charged to the power receiving devices a and c. In this manner, charging operations of the power receiving devices a and c are stopped, and power is continuously supplied only to the power receiving device b.

FIG. 22 is an explanatory drawing showing a display example of charging information displayed on the display unit 356 within the wireless power transfer device 100 of FIG. 11 when the power receiving device to be prioritized and supplied with power is selected. FIG. 23 is an explanatory drawing showing a display example continued from FIG. 22.

When the power receiving device b which is the power receiving device to be prioritized and supplied with power is selected by the user, an indication indicating that the power receiving device b is selected is displayed on the display unit 356. FIG. 22 shows an example in which the number of the power receiving device b is displayed as "(2)", indicating that the power receiving device b is prioritized and selected.

Thereafter, "on" indicating that power is being supplied to the power receiving device b and "off" indicating that supplying of power to the remaining power receiving devices a and c is stopped is displayed on the display unit 356 as shown in FIG. 23.

Figure 24:
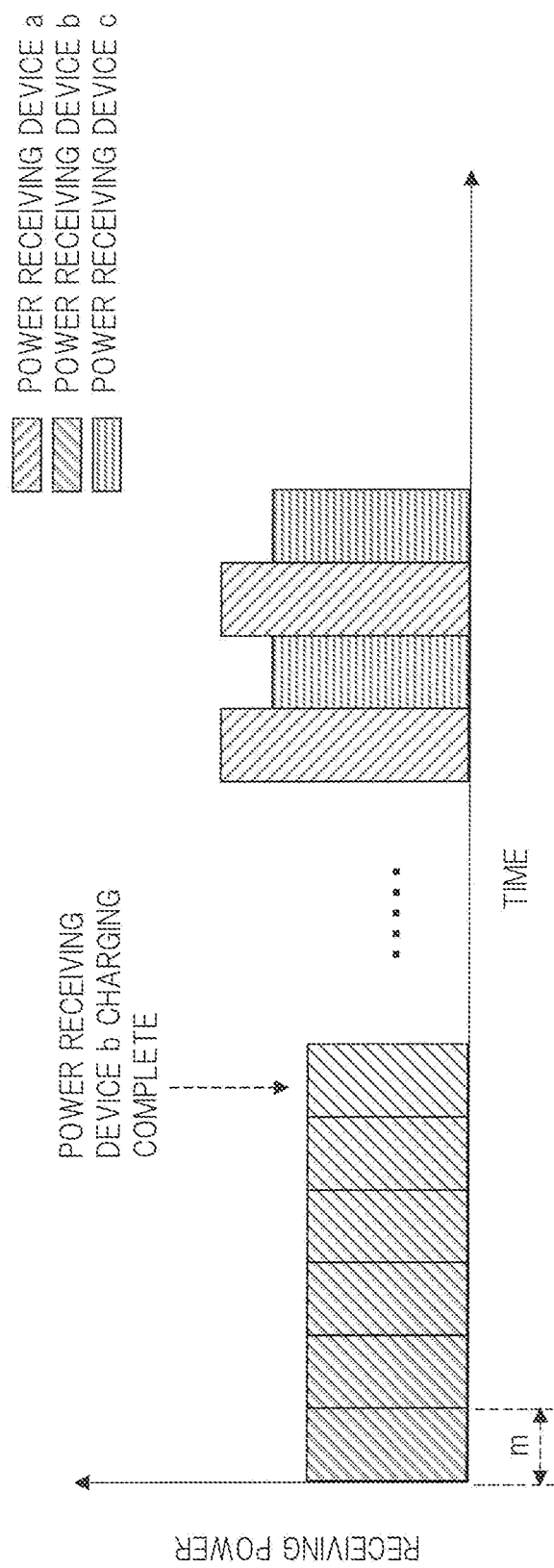
FIG. 24 is an explanatory drawing continued from FIG. 21.

FIG. 24 is an explanatory drawing continued from FIG. 21. FIG. 25 is an explanatory drawing showing a display example of the charging information displayed on the display unit 356 within the wireless power transfer device 100 of FIG. 11 when charging of the power receiving device b is completed. FIG. 26 is an explanatory drawing showing a display example of the charging information continued from FIG. 25.

When charging of the power receiving device b selected by the user is completed as shown on the left side of FIG. 24, "0" minutes for the charging time of the power receiving device b and "on→off" indicating that the power supplying status has transitioned from on to off is displayed on the display unit 356 as shown in FIG. 25.

When charging of the power receiving device b is completed, the control circuit 132 outputs a control signal which start charging operations to the power receiving devices a and b. Accordingly, the power receiving devices a and b start their charging operations.

When charging of the power receiving device b is completed and charging operations of the power receiving devices a and b are started, "off" for the power receiving device b, "on" for each of the power receiving devices a and c for the power supplying status and the time to complete charging of each of the power receiving devices a and c are displayed on the display unit 356.

Here, an example in which the user selects the power receiving device, that is, the mobile device, to be prioritized and supplied with power is described; however, the power receiving device does not necessarily need to be selected by the user. For example, the order of priority may be determined from the order the devices are placed on the power supplying pad 355. The control circuit 132 determines the order the devices are placed on the power supplying pad 355 by, for example, the order of authentication between the wireless power transfer device 100 and the power receiving devices.

Figure 27:
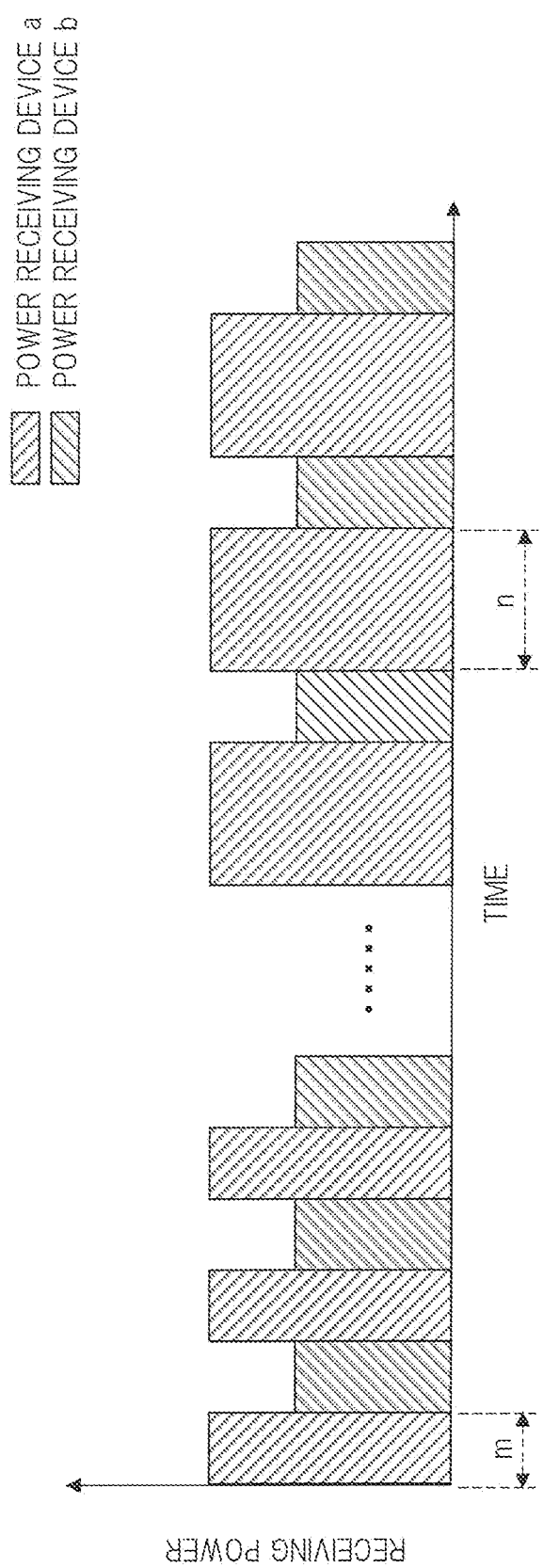
FIG. 27 is an explanatory drawing showing still another example of a charging operation performed by the wireless power transfer device of FIG. 9.

FIG. 27 is an explanatory drawing showing still another example of a charging operation performed by the wireless power transfer device 100 of FIG. 9. FIG. 27 shows a charging operation when supplying power to two power receiving devices a and b.

The left side of FIG. 27 shows a case where two mobile devices, that is, the power receiving devices a and b within the corresponding mobile devices, are not given order of priority and are supplied with power. In addition, the right side of FIG. 27 shows a case where the power receiving device a selected by the user is prioritized and supplied with power.

FIG. 28 is an explanatory drawing showing a display example of the charging information displayed on the display unit 356 within the wireless power transfer device 100 of FIG. 11 when supplying power to the power receiving devices a and b. FIG. 29 is an explanatory drawing showing a display example of charging information continued from FIG. 28.

In the case where the power receiving devices a and b are not given the order of priority, each of the power receiving devices a and b is supplied with power for the same amount of time m as shown on the left side of FIG. 27. At this time, as shown in FIG. 28, "60" minutes for the time to complete charging of the power receiving device a, "30" minutes for the time to complete charging of the power receiving device b, "on" for the power supplying status of the power receiving device a and "on" for the power supplying status of the power receiving device b are displayed on the display unit 356.

Thereafter, when the power receiving device a is selected by the user such that the power receiving device a is prioritized and supplied with power, power is supplied to the power receiving device a for time n which is a time longer than time m. Thus, instead of supplying power to only the selected power receiving device, power is supplied to both the power receiving devices not selected and selected while increasing the power supplying time of only the selected power receiving device. As a result, the selected power receiving device is prioritized and supplied with power.

When the power receiving device a to be prioritized and supplied with power is selected by the user, an indication indicating that the power receiving device a is selected is displayed on the display unit 356. FIG. 29 shows an example in which the number of the power receiving device a is displayed as "(1)", indicating that the power receiving device a is prioritized and selected.

FIG. 29 shows an example in which the time to complete charging of the power receiving device a is shortened from "60" minutes shown in FIG. 28 to "40" minutes since the power supplying time for the power receiving device a has changed from time m to a longer time n.

In addition, the time to complete charging of the power receiving device a may be set by the user. For example, when the user selects the power receiving device a to be prioritized and supplied with power, the user enters a desired time to complete charging. The time is entered with using, for example, a virtual keyboard (not shown) or the like displayed on the display unit 356.

The control circuit 132 calculates the power supplying time n based on the time to complete charging entered from the virtual keyboard on the display unit 356. Then, power is supplied to the power receiving device to be prioritized and supplied with power based on the calculated power supplying time n. The necessary power supplying time n can be obtained in the control circuit 132 from the receiving power and the time to complete charging.

The time (minutes) to complete charging desired by the user may be entered with using, for example, buttons (not shown) or the like provided on the power supplying pad 355 instead of the virtual keyboard.

By up/down operations of the button, the user can specify the time to complete charging of the device.

Note that, in the descriptions above, limitation of the power receiving device is set by the number of devices; however, this limitation does not necessarily need to be the number of devices, and the above-described charging operation may be applied when, for example, the total power necessary to charge a plurality of power receiving devices exceeds a maximum power transfer rating of the wireless power transfer device 100.

In the foregoing, the invention made by the present inventors has been concretely described based on the embodiments. However, it goes without saying that the present invention is not limited to the foregoing embodiments, and various modifications can be made within the scope of the present invention.

Note that the present invention is not limited to the foregoing embodiments and includes various modifications. For example, the foregoing embodiments have been described in detail such that the description of the present invention is easily understandable, and are not necessarily limited to comprise all of the configurations described above.

In addition, a portion of the configuration of one of the embodiments can be replaced with the configuration of another embodiment. Further, the configuration of one of the embodiments can be added to the configuration of another embodiment. Furthermore, other configurations may be added to, may be removed from or may replace a portion of the configuration of each of the embodiments.

<Additional Statements>

Some of the contents of the foregoing embodiments will be described below.

(1) A wireless power transfer device for wirelessly transferring power to a plurality of charging target devices, the wireless power transfer device including: a power source unit for generating power to be transferred to the charging target device; a control unit for controlling an operation of the power source unit; and a communication unit for performing communication with the charging target device, wherein the control unit performs communication with the charging target device to be charged via the communication unit, detects the number of charging target devices to be charged, determines whether or not the number of detected charging target devices is less than or equal to a predetermined number of chargeable devices and, if it is determined that the number of detected charging target devices is greater than the predetermined number of chargeable devices, performs controls such that the same number of charging target devices as the predetermined number of chargeable devices are prioritized and charged.

(2) The wireless power transfer device according to additional statement (1), wherein, if the control unit determines that the number of detected charging target devices is greater than the predetermined number of chargeable devices, the charging target device having a high or low remaining battery power is prioritized and charged, and the remaining battery power is obtained via communication with the charging target device detected by the communication unit.

(3) The wireless power transfer device according to additional statement (1), wherein, if the control unit determines that the number of detected charging target devices is greater than the predetermined number of chargeable devices, the charging target device having a long or short charging time is prioritized and charged, and the charging time is obtained via communication with the charging target device detected by the communication unit.

(4) The wireless power transfer device according to additional statement (1), wherein, when charging of the prioritized charging target device is completed, the control unit sends a control signal which starts a charging operation to the charging target device not yet charged and performs controls such that this charging target device is charged.

LIST OF REFERENCE SIGNS

100: wireless power transfer device
100a: wireless power transfer device
100b: wireless power transfer device
101: current detector
102: variable voltage power source
104: field effect transistor
105: choke coil
111: electrostatic capacitor
112: inductor
113: electrostatic capacitor
114: electrostatic capacitor
115: inductor
116: electrostatic capacitor
121: resonant capacitor
123: power transfer coil
124: pick-up coil
125: mobile device
125a: mobile device
125b: mobile device
125c: mobile device
126: communication circuit
127: IC card
131: communication circuit
132: control circuit
133: detector circuit
136: bandpass filter
137: bandpass filter
138: bandpass filter
140: power transfer unit
141: power transfer unit
201: detector circuit
202: oscillator
203: variable division circuit
204: bandpass filter
205: mixer circuit
206: low-pass filter
301a: pick-up coil
301b: pick-up coil
301c: pick-up coil 301d: pick-up coil
304: switch circuit
350: power receiving device
351: power receiving device
352: control circuit
353: power source circuit
355: power supplying pad
356: display unit

The invention claimed is:

1. A wireless power transfer device for wirelessly transferring power by using inductive coupling to a charging target device placed in the vicinity of a charging pad, the wireless power transfer device comprising:
an amplifier for performing power amplification;
a series resonant circuit constituted by a resonant capacitor and a power transfer coil; and
a foreign material detector for detecting a non-charging device, which is not a charging target, placed in the vicinity of the charging pad,
wherein the foreign material detector detects the non-charging device by a signal component emitted through inductive coupling with the power transfer coil from the device placed in the vicinity of the charging pad when transferring power,
the foreign material detector comprises:
a signal detector for detecting the signal component emitted from the device placed in the vicinity of the charging pad;
a first filter for allowing a signal having a predetermined frequency among the signal components detected by the signal detector to pass therethrough;
a detector circuit for detecting the signal passed through the first filter as a signal level; and
a controller for determining whether or not the non-charging device which is not the charging target is placed in the vicinity of the charging pad based on the signal level detected by the detector circuit, and
the controller compares the signal level detected by the detector circuit and a predetermined threshold and, if it is determined that the signal level is outside a range of the predetermined threshold, determines that the non-charging device is placed in the vicinity of the charging pad.

2. The wireless power transfer device according to claim 1,
wherein the first filter is a bandpass filter for allowing signal components of at least a fundamental wave, a second-order harmonic wave and a third-order harmonic wave to pass therethrough, and
the detector circuit detects signal levels of at least the fundamental wave, the second-order harmonic wave and the third-order harmonic wave passed through the bandpass filter.

3. The wireless power transfer device according to claim 1,
wherein the first filter is a bandpass filter for allowing signal components of at least a fundamental wave and a second-order harmonic wave to pass therethrough, and
the detector circuit detects signal levels of at least the fundamental wave and the second-order harmonic wave passed through the bandpass filter.

4. The wireless power transfer device according to claim 1, further comprising:
a second filter for filtering the signal detected by the signal detector; and
a signal converter for converting the signal filtered by the second filter into a certain intermediate frequency signal,
wherein the first filter allows a signal having a predetermined frequency among the intermediate frequency signals transmitted from the signal converter to pass therethrough, and
the detector circuit detects the signal passed through the first filter as a signal level.

5. The wireless power transfer device according to claim 4, further comprising
a switch for selecting one signal from a plurality of transmitted signals and outputting the signal,
wherein the signal detector is constituted by a plurality of coils,
the switch selects one signal component from signal components detected by the plurality of coils and outputs the signal component to the second filter based on a control signal, and
the controller generates the control signal so as to sequentially output the signal components detected by the plurality of coils to the second filter.

6. The wireless power transfer device according to claim 1,
wherein the signal detector is constituted by a coil wound with one turn, and
the coil is provided so as to surround an outer periphery of the power transfer coil provided in the charging pad.

7. The wireless power transfer device according to claim 1,
wherein the amplifier is a Class E switching amplifier.

8. The wireless power transfer device according to claim 1, further comprising
a third filter for filtering a signal transmitted from the amplifier,
wherein the third filter is constituted by a third-order, seventh-order or eleventh-order low-pass filter.

9. The wireless power transfer device according to claim 1, further comprising
a communication unit for performing communication with the charging target device,
wherein the communication unit obtains a receiving power of the charging target device from the charging target device, and
the controller calculates a difference between the receiving power obtained by the communication unit and a transferring power being transferred to the charging target device by the wireless power transfer device and, if a calculated result is greater than or equal to a predetermined threshold, determines that a non-charging device is placed in the vicinity of the charging pad.

10. The wireless power transfer device according to claim 1, further comprising
a communication unit for performing communication with the charging target device,
wherein, when the detector circuit is detecting a signal, the controller outputs a control signal which stops a charging operation of the charging target device to the charging target device via the communication unit.

11. The wireless power transfer device according to claim 1, further comprising
a communication unit for performing communication with the charging target device,
wherein the communication unit receives a response signal sent from the charging target device, the controller determines whether or not the charging target device is placed in the vicinity of the charging pad based on the response signal received by the communication unit, and the response signal is a signal generated in accordance with a magnitude of power transferred when charging of the charging target device is started.

* * * * *